(12) United States Patent
Yi

(10) Patent No.: US 10,511,195 B2
(45) Date of Patent: Dec. 17, 2019

(54) ENERGY CONVERSION AND STORAGE APPARATUS USING ELECTRONIC WAVE

(71) Applicant: POMUMIDEA, Seoul (KR)

(72) Inventor: Seunghyeon Yi, Suwon-si (KR)

(73) Assignee: PMUMIDEA, Seoul (KR)

( * ) Notice: Subject to any disclaimer, the term of this patent is extended or adjusted under 35 U.S.C. 154(b) by 1012 days.

(21) Appl. No.: 15/110,789

(22) PCT Filed: Apr. 9, 2014

(86) PCT No.: PCT/KR2014/003057
§ 371 (c)(1),
(2) Date: Jul. 11, 2016

(87) PCT Pub. No.: WO2015/005564
PCT Pub. Date: Jan. 15, 2015

(65) Prior Publication Data
US 2017/0012479 A1    Jan. 12, 2017

(30) Foreign Application Priority Data

| Jul. 9, 2013 | (KR) | 10-2013-0080318 |
| Feb. 17, 2014 | (KR) | 10-2014-0017674 |
| Mar. 14, 2014 | (KR) | 10-2014-0030565 |
| Mar. 28, 2014 | (KR) | 10-2014-0036558 |

(51) Int. Cl.
*H02J 50/20* (2016.01)
*H02J 7/02* (2016.01)
*H01R 13/66* (2006.01)
*H02J 50/00* (2016.01)
*H01R 31/06* (2006.01)
*H02M 7/04* (2006.01)

(52) U.S. Cl.
CPC .......... *H02J 50/20* (2016.02); *H01R 13/6675* (2013.01); *H01R 31/065* (2013.01); *H02J 7/025* (2013.01); *H02J 50/00* (2016.02); *H02M 7/04* (2013.01)

(58) Field of Classification Search
CPC .. H02J 7/025; H02J 50/12; H02J 50/80; H02J 50/10; H02J 50/20; H02J 5/005; H02J 50/60; H02J 50/70
USPC .................. 307/106, 107, 108, 109, 110
See application file for complete search history.

(56) References Cited

U.S. PATENT DOCUMENTS

| 5,982,638 A | * | 11/1999 | Tang | .................. | H02M 1/4258 363/16 |
| 2014/0001851 A1 | * | 1/2014 | Murase | ................ | H04B 5/0037 307/36 |

FOREIGN PATENT DOCUMENTS

| JP | 2003111312 A | 4/2003 |
| KR | 1019960030958 A | 9/1996 |

(Continued)

OTHER PUBLICATIONS

International Search Report dated Jun. 17, 2014 for PCT/KR2014/003057 and English translation.
(Continued)

*Primary Examiner* — John W Poos
(74) *Attorney, Agent, or Firm* — Finch & Maloney PLLC

(57) ABSTRACT

Provided is an energy conversion and storage apparatus using an electronic wave. The device comprises: a rectifier which rectifies an alternating current generated by converting an electronic wave inputted from the outside; and storage which receives and stores the rectified alternating current and is grounded.

11 Claims, 16 Drawing Sheets

(56) References Cited

FOREIGN PATENT DOCUMENTS

| | | | |
|---|---|---|---|
| KR | 100440247 | B1 | 7/2004 |
| KR | 20110003455 | A | 1/2011 |
| KR | 101022760 | B1 | 3/2011 |

OTHER PUBLICATIONS

Written Opinion dated Jun. 17, 2014 for PCT/KR2014/003057 and English translation.
IPRP dated Jan. 12, 2016.

\* cited by examiner

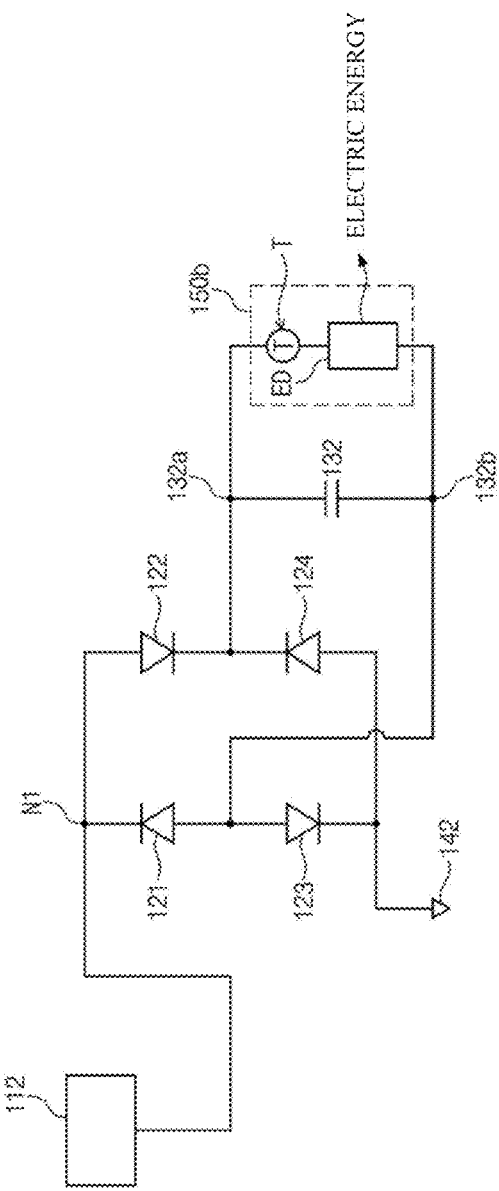
FIG. 6
FIG. 7
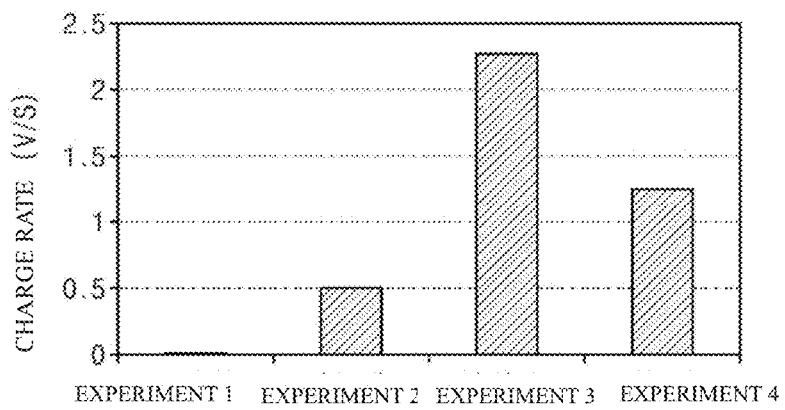

ENERGY CONVERSION AND STORAGE APPARATUS USING ELECTRONIC WAVE

CROSS-REFERENCE TO RELATED APPLICATIONS

This application is a 371 of PCT/KR2014/003057, filed Apr. 9, 2014, which claims the benefit of Korean Patent Application No. 10-2013-0080318, filed Jul. 9, 2013, 10-2014-0017674 filed Feb. 17, 2014, 10-2014-0030565 filed Mar. 14, 2014 and 10-2014-0036558 filed Mar. 28, 2014, the contents of each of which are incorporated herein by reference.

TECHNICAL FIELD

Embodiments of the inventive concept described herein relate to an energy conversion and storage apparatus using an electronic wave.

BACKGROUND ART

Exhaustion of fossil fuels inevitably promotes many studies for developing alternative energy. The kinds of alternative energy appearing before the footlights at present are atomic power energy, solar power energy, wind power energy, tidal power energy, and so on. Atomic power energy requires an enormous expenditure for treatment of radioactive wastes and construction of an atomic power station. Solar power energy is insufficient in power generation relative to investment. Wind/tidal power energy is limited to installable areas.

As solutions for the shortness in utilizing the non-fossil energy, many studies are sprightly proceeding to employ an electronic wave, which is generated from diverse electronic devices such as television set, computer, or inductive generator using an electronic wave as disclosed in Korean Patent Publication No. 10-2011-0003455, as an energy source.

DETAILED DESCRIPTION OF THE INVENTION

Technical Problem

Embodiments of the inventive concept are to provide an electronic-wave energy conversion and storage apparatus with high efficiency.

Embodiments of the inventive concept are to an electronic-wave energy conversion and storage apparatus with high reliability.

Embodiments of the inventive concept are to an energy conversion and storage apparatus with high absorbency of an electronic wave.

Embodiments of the inventive concept is to provide an energy conversion and storage apparatus efficiently absorbing and storing an electronic wave, which is generated from a power transport apparatus, as an electric energy.

Technical Solution

For solving the technical subjects, embodiments of the inventive concept may provide an energy conversion and storage apparatus using an electronic wave.

According to an embodiment, an energy conversion and storage apparatus using an electronic wave may include a rectifying part configured to rectify an alternating current (AC) generated through conversion of an electronic wave that is received from an external source, and a storing part configured to receive and store the rectified AC and to receive a ground.

According to an embodiment, the storing part may include a capacitor including one end and the other end, wherein one of the one end and the other end of the capacitor may be switched with a ground in accordance with a polarity of the AC.

According to an embodiment, the other end of the capacitor may be provided with a ground in a section where the AC is polarized in (+), wherein the one end of the capacitor may be provided with a ground in a section where the AC is polarized in (−).

According to an embodiment, the energy conversion and storage apparatus using an electronic wave may further include a grounding part connected with the rectifying part but not directly connected with the storing part, wherein the grounding part may be configured to provide a ground to the storing part.

For solving the technical subjects, embodiments of the inventive concept may provide a rectifying circuit included in an energy conversion and storage apparatus using an electronic wave.

According to an embodiment, a rectifying circuit may include a first node receiving an AC, a first diode having a cathode connected with the first node, a second diode having an anode connected with the first node, a third diode including an anode, which is connected with the anode of the first diode, and a cathode provided with a ground, and a fourth diode including an anode, which is connected with the cathode of the third diode and provided with a ground, and a cathode connected with a cathode of the second diode.

For solving the technical subjects, embodiments of the inventive concept may provide an energy conversion and storage apparatus using an electronic wave.

According to an embodiment, an energy conversion and storage apparatus using an electronic wave may include an electronic wave-current converting part configured to convert the electronic wave, which is generated from a power transport line, into an AC, a rectifying part configured to rectify the AC, and a storing part configured to store the rectified AC and to receive a ground.

According to an embodiment, the power transport apparatus may include a first power transport tower, a second power transport tower isolated from the first power transport tower, and a power transport line connected to the first power transport tower and the second power transport tower, wherein the electronic wave-current converting part may be disposed adjacent to the first power transport tower, the second power transport tower, and the power transport line, and shaped in a mesh or sheet made of a conductive material.

According to an embodiment, the electronic wave-current converting part may include an outer frame, and an inner frame connected with the outer frame and shaped of a mesh in the outer frame, wherein the outer frame is wider than the inner frame in a width.

According to an embodiment, the power transport apparatus may include a first power transport tower, a second power transport tower isolated from the first power transport tower, a first power transport line connected with the first power transport tower and the second power transport tower, and a second power transport line connected with the first power transport tower and the second power transport tower and isolated from the first power transport line, wherein the electronic wave-current converting part may be disposed between the first power transport line and the second power transport line and elongated toward a direction in which the first and second power transport lines are elongated.

According to an embodiment, the rectifying part may include a first node receiving an AC, a first diode having a cathode connected with the first node, a second diode having an anode connected with the first node, a third diode including an anode, which is connected with the anode of the first diode, and a cathode provided with a ground, and a fourth diode including an anode, which is connected with the cathode of the third diode and provided with a ground, and a cathode connected with a cathode of the second diode.

According to an embodiment, an energy conversion and storage apparatus may include first and second input terminals configured to receive a voltage from an external source, a ground providing part connected with the first and second input terminals and configured to generate a ground from the voltage, a ground connecting part connected with an external grounding part, a current input terminal configured to receive a current an external source, and a converting part configured to receive the ground from the ground providing part and/or the ground connecting part, connected with the current input terminal to rectify and store the current, which is received from the external source, as electric energy.

According to an embodiment, the current input into the current input terminal may include an AC that is converted from an electronic wave generated from a power consumption/transport apparatus.

According to an embodiment, the energy conversion and storage apparatus using an electronic wave may further include first and second output terminals connected respectively with the first and second input terminals, and configured to receive the voltage and to output the voltage externally, and an EMI filter configured to connect the first and second input terminals with the first and second output terminals.

According to an embodiment, the first and second input terminals may be connected with an external outlet to receive the voltage, wherein the ground connecting part may be connected with a grounding part of the external outlet.

According to an embodiment, the energy conversion and storage apparatus using an electronic wave may further include first and second output terminals connected respectively with the first and second input terminals, and configured to receive the voltage and to output the voltage externally, wherein the current input terminal may be connected with the first and second output terminals and connected with a ground terminal of a plug of a power consumption/transport apparatus that receives the voltage from the first and second output terminals and consumes or transports power.

Advantageous Effects of the Invention

According to embodiments of the inventive concept, since an energy conversion and storage apparatus using an electronic wave may include a rectifying part to rectify an AC which is generated from conversion of an electronic wave received from an external source, and a storing part to store the rectified AC and to receive a ground, it may be allowable to provide an electronic-wave energy conversion and storage apparatus, with high efficiency and high reliability, which may reuse energy dissipated by the electronic wave.

According to embodiments of the inventive concept, since an energy conversion and storage apparatus receiving a ground from a ground providing part includes the ground providing part to generate the ground from a voltage input from an external source, and a converting part to receive the ground, to rectify an AC, and to store the rectified AC as an electric energy, it may be allowable to provide the energy conversion and storage apparatus with highly improved electronic-wave absorbency, high efficiency, and high reliability.

DESCRIPTION OF THE DRAWINGS

FIGS. 5 and 6 illustrate additional circuits included in a modification of an energy conversion and storage apparatus using an electronic wave in accordance with an embodiment of the inventive concept.

FIG. 7 is a graphic diagram showing an initial charge rate of a voltage stored in a capacitor of an energy conversion and storage apparatus using an electronic wave in accordance with an embodiment of the inventive concept, diversifying a kind of grounding part in the circuit diagram described in conjunction with FIG. 3.

BEST MODE

Hereafter, embodiments of the inventive concept will be described in conjunction with the accompanied figures. Embodiments of the inventive concept may be variable in various forms and the scope of the inventive concept may not be construed as restricting the following embodiments. These embodiments will be provided to help those skilled in the art to fully comprehend the inventive concept as possible. Shapes or patterns of the accompanied figures are exaggerated for more clearly illustrating structural configurations of elements in the figures.

In the specification, in the case that an element is described as being on a second element, it means that the element may be formed on second element or a third element is interposed between the element and the second element. Additionally, in the figures, thicknesses of films or areas are exaggerated for clear explanation and illustration of technical matters.

In various embodiments of the specification, the terms 'first', 'second', 'third', and so on are used for enumerating a number of elements, whereas those elements may not be restrictive to such terms. Those terms will be merely used to differentiate an element from another element each other. Accordingly, a first element of an embodiment may be indicated as a second element in another embodiment. Embodiments described and exemplified herein may also include their complementary embodiments. Additionally, the term 'and/or' in the specification will be used as including at least one of elements written before and after it.

In the description, the terms of a singular form may also include plural forms unless otherwise specified. The term 'include', 'have', or its diverse inflections or conjugations is presence of a feature, a number, a step, an element, or a combination of them which is described in the specification, and may not be construed as excluding presence or addition with one or more features, numbers, steps, elements, or combinations of them. Additionally, the term 'connect' used herein will be used to mean all cases of connecting a plurality of elements directly and indirectly.

Additionally, some descriptions will not be provided in the case that the details about known functions or configurations rather cause the points of the inventive concept to be vague unnecessarily.

Figure 1:
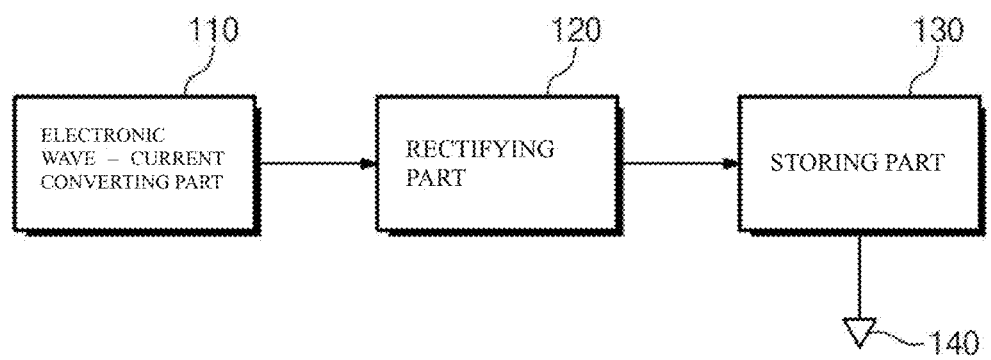
FIG. 1 illustrates an energy conversion and storage apparatus using an electronic wave in accordance with an embodiment of the inventive concept.

FIG. 1 illustrates an energy conversion and storage apparatus using an electronic wave in accordance with an embodiment of the inventive concept.

Referring to FIG. 1, an energy conversion and storage apparatus using an electronic wave in accordance with an embodiment of the inventive concept may include a rectifying part 120 and a storing part 130.

The rectifying part 120 may rectify an alternating current (AC). The rectifying part 120 may transmit a rectified AC to the storing part 130.

The AC may be a surface current generated from the mechanism that an electronic wave meets a conductive material. The surface current may flow along the surface of the conductive material. For example, an AC may be a current, for which an electronic wave generated from diverse electronic devices (e.g., a power consumption apparatus such as computer, refrigerator, television, mobile phone, and so on, or a power transport apparatus) is converted into a surface current, flowing into a ground. As another example, the AC may be a current, for which an electronic wave generated in the inside or outside of a building is converted into a surface current, flowing into a ground of the building.

Different from the aforementioned embodiment, an energy conversion and storage apparatus using an electronic wave in accordance with another embodiment of the inventive concept may further include an electronic wave-current converting part 110. In this configuration, the electronic wave-current converting part 110 may convert an electronic wave, which is received from an external source, into an AC. For example, the electronic wave-current converting part 110 may be shaped in a sheet or mesh made of a conductive material. According to an embodiment, the sheet-type electronic wave-current converting part 110 may be formed in an uneven form having concaves and convexes.

In a microscopic view, an electronic wave incident on a conductive material generates an AC that flows along the surface of the conductive material, and the AC regenerates an electronic wave. The regenerated electronic wave is reflected on the conductive material.

An energy conversion and storage apparatus using an electronic wave in accordance with an embodiment of the inventive concept may transmit an AC, which is generated by an electronic wave, to the rectifying part 120 before the AC generated by the electronic wave is converted again into an electronic wave. Accordingly, an energy conversion and storage apparatus using an electronic wave in accordance with an embodiment of the inventive concept may store an AC, which is generated through conversion of an electronic wave, as electric energy.

Figure 2:
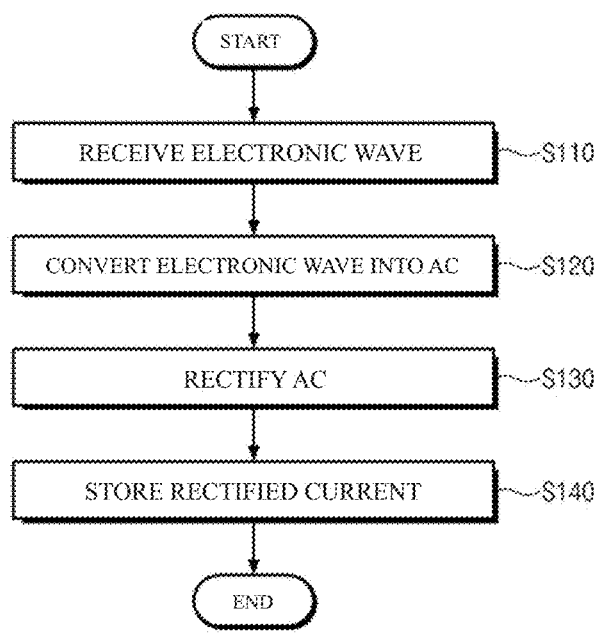
FIG. 2 is a flow chart showing an operating method of an energy conversion and storage apparatus using an electronic wave in accordance with an embodiment of the inventive concept.

FIG. 2 is a flow chart showing an energy conversion and storage method using an electronic wave in accordance with an embodiment of the inventive concept.

An electronic wave may be received from an external source (S110). The electronic wave may include electronic waves generated from diverse electronic devices. The electronic wave may be converted into an AC (S120). According to an embodiment of the inventive concept, the electronic wave, as described with FIG. 1, may be converted into an AC through the electronic wave-current converting part 110. The AC may be rectified (S130). The rectified AC may be stored in the storing part 130 described with FIG. 1 (S140).

Figure 3:
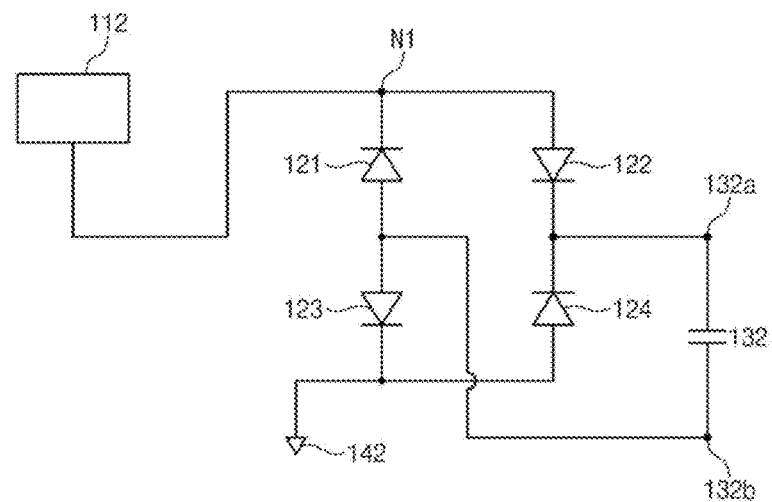
FIG. 3 is a circuit diagram illustrating an energy conversion and storage apparatus using an electronic wave in accordance with an embodiment of the inventive concept.

FIG. 3 is a circuit diagram illustrating an energy conversion and storage apparatus using an electronic wave in accordance with an embodiment of the inventive concept.

Referring to FIG. 3, an energy conversion and storage apparatus using an electronic wave in accordance with an embodiment of the inventive concept may include first to fourth diodes 121, 122, 123, and 124, and a capacitor 132 connected with the diodes 121, 122, 123, and 124 and forming the storing part.

An AC outputting part 112 may convert an electronic wave into an AC and may output the AC to a first node N1. The AC outputting part 112 may be an electronic wave-current converting part 110 which is described with FIG. 1. Different from this, the electronic wave-current converting part 110 may be an electronic device outputting an AC generated by conversion of an electronic wave.

A cathode of the first diode 121 may be connected to the first node N1. An anode of the second diode 122 may be connected to the first node N1. A cathode of the second diode 122 may be connected to one end 132a of the capacitor 132. An anode of the first diode 121 may be connected to the other end 132b of the capacitor 132b.

An anode of the third diode 123 may be connected with the anode of the first diode 121. A cathode of the third diode 123 may be connected with a grounding part 142 to provide a ground to the cathode of the third diode 123.

A cathode of the fourth diode 124 may be connected with one end 132a of the capacitor 132. An anode of the fourth diode 124 may be connected with the grounding part 142 to provide a ground to an anode of the fourth diode 124.

The first to fourth diodes 121, 122, 123, and 124 may rectify an AC that is generated by conversion of an electronic wave, and may transmit the rectified AC to the capacitor 132. The capacitor 132 may store the rectified AC as electric energy.

In detail, an (+)-polarized component of the AC generated by conversion of an electronic wave may pass the second diode 122 and may be stored in the one end 132a of the capacitor 132. While the (+)-polarized component of the AC is being stored in the capacitor 132, the third diode 123 and the grounding part 142 may provide a ground to the other end 132b of the capacitor 132.

A (−)-polarized component of the AC generated by conversion of an electronic wave may pass the first diode 121 and may be stored in the other end 132b of the capacitor 132. While the (−)-polarized component of the AC is being stored in the capacitor 132, the fourth diode 124 and the grounding part 142 may provide a ground to the one end 132a of the capacitor 132.

Summarily, the first to fourth diodes 121~124 and the grounding part 142 may provide a ground to the other end 132b of the capacitor 132 in the section for which the AC is (+)-polarized, while may provide a ground to the one end 132a of the capacitor 132 in the section for which the AC is (−)-polarized.

That is, according to a polarity of the AC, one of the one end 132a and the other end 132b of the capacitor 132 may be switched into a ground. In detail, in a (+)-polarized section of the AC, the other end 132b of the capacitor 132 may be provided with a ground, and in a (−)-polarized section of the AC, the one end 132a of the capacitor 132 may be provided with a ground.

The grounding part 142 may be implemented in various forms. The grounding part 142 may be directly connected with the third and fourth diodes 123 and 124 which form the rectifying part, but may not be directly connected with the storing part 132.

For example, in the case that an energy conversion and storage apparatus using an electronic wave in accordance with an embodiment of the inventive concept stores an AC that is generated by conversion of the electronic wave generated from an electronic device placed in the inside or outside of a building, the grounding part 142 may be a ground rod of the building. In this case, as the ground rod increases in a mass, electric energy stored in the capacitor may increase in a storage rate. Additionally, as the ground rod increases in a volume, the electric energy stored in the capacitor 132 increases in a storage rate. Additionally, as the ground rod increases in electrical conductivity, the electric energy stored in the capacitor 132 increases in a storage rate.

As another example, in the case that an energy conversion and storage apparatus using an electronic wave in accordance with an embodiment of the inventive concept stores an AC that is generated by conversion of an electronic wave generated from a household electrical appliance (e.g., refrigerator, computer, or washing machine), the grounding part 142 may be an outlet ground.

As still another example, in the case that an energy conversion and storage apparatus using an electronic wave in accordance with an embodiment of the inventive concept stores an AC that is generated by conversion of an electronic wave generated from a portable electronic device (e.g., mobile phone or MP3 player), the grounding part 142 may be a virtual ground or a neutral ground. In this case, an energy conversion and storage apparatus using an electronic wave in accordance with an embodiment of the inventive concept may further include the grounding part 142.

Figure 4:
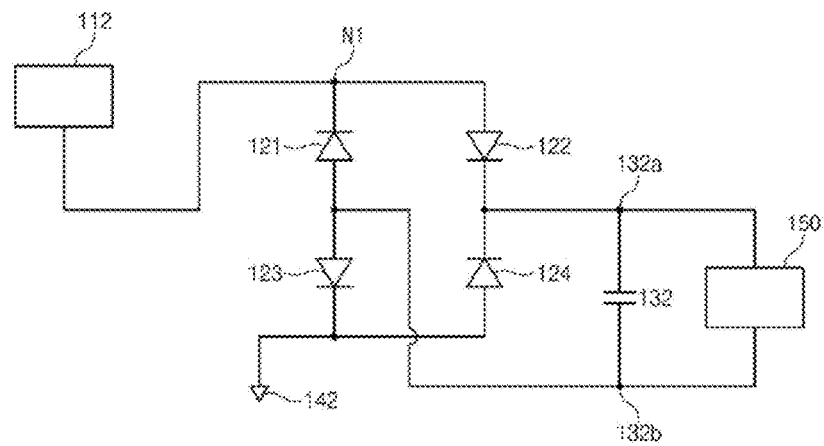
FIG. 4 illustrates a modification of an energy conversion and storage apparatus using an electronic wave in accordance with an embodiment of the inventive concept.

FIG. 4 illustrates a modification of an energy conversion and storage apparatus using an electronic wave in accordance with an embodiment of the inventive concept.

Referring to FIG. 4, an AC outputting part 122 and first to fourth diodes 121, 122, 123, and 124, which are described with FIG. 3, may be also provided to the modification of the energy conversion and storage apparatus. The modification of the energy conversion and storage apparatus using an electronic wave in accordance with an embodiment of the inventive concept may further include an additional circuit 150 which is connected with one end 132a and the other end 132b of a capacitor 132.

The additional circuit 150 may be an electrical contact switch. In the case that electric energy stored in the opposite ends 132a and 132b of the capacitor 132 is charged in a level equal to or larger than a specific level, the electrical contact switch may be closed to discharge the electric energy. Due to this operation, the energy conversion and storage apparatus according to an embodiment of the inventive concept may be protected from an overcharge.

Different from the aforementioned embodiments, the additional circuit 150 may be am amplifying circuit. In this configuration, the amplifying circuit may amplify electric energy, which is stored in the opposite ends 132a and 132b of the capacitor 132, and may provide the amplified electric energy to another device.

Otherwise, different from the aforementioned embodiments, the additional circuit 150 may include all of the electrical contact switch and the amplifying circuit.

Figure 5:
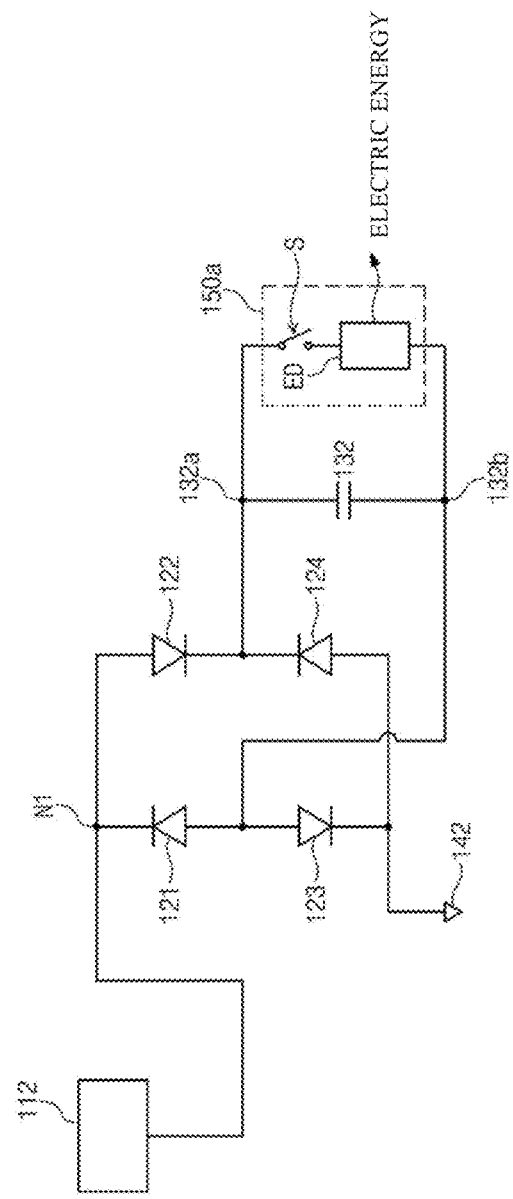

FIGS. 5 and 6 illustrate additional circuits included in a modification of an energy conversion and storage apparatus using an electronic wave in accordance with an embodiment of the inventive concept.

Referring to FIG. 5, an additional circuit 150b may be connected to opposite ends of a capacitor 132 of the energy conversion and storage apparatus using an electronic wave described with FIG. 3. The additional circuit 150b may include a timer T and a power transmission element ED.

The timer T and the power transmission element ED of the additional circuit 150b may allow electric energy, which is stored in the capacitor 132, to be transmitted to another device every lapse of a reference time. For example, every 10 seconds, electric energy stored in the capacitor 132 may be transmitted to another device (e.g., television or refrigerator) which needs electricity. Otherwise, electric energy stored in the capacitor 132 may be transmitted to a power storage facility every such a reference time. The reference time may be set differently in accordance with a kind of device generating an electronic wave.

Referring to FIG. 6, an additional circuit 150c may be connected to opposite ends of a capacitor 132 of the energy conversion and storage apparatus using an electronic wave described with FIG. 3. The additional circuit 150c may include a switch S and a power transmission element ED. The switch S may be an electrical contact switch. The electrical contact switch may be disposed in a vacuum tube. The switch S may be connected to opposite ends 132a and 132b of the capacitor 132. If a voltage stored in the capacitor 132 is equal to or higher than a reference voltage, the switch S may be closed. In the case that the switch S is closed, electric energy stored in the capacitor 132 may be transmitted through the power transmission element ED to another device (e.g., television or refrigerator) which needs electricity. Otherwise, electric energy stored in the capacitor 132 may be transmitted to a power storage facility every reference time. The reference time may be set differently in accordance with a kind of device generating an electronic wave.

FIG. 7 is a graphic diagram showing an initial charge rate of a voltage stored in a capacitor of an energy conversion and storage apparatus using an electronic wave in accordance with an embodiment of the inventive concept, diversifying a kind of grounding part in the circuit diagram described in conjunction with FIG. 3.

Referring to FIG. 7, Experiment 1 to Experiment 4 are differentiated in a kind of grounding part in the circuit diagram described with FIG. 3. Experiment 1 is performed without a grounding part and Experiment 2 employs a human body as the grounding part. Experiment 3 uses an outlet ground as a grounding part and Experiment 4 uses a virtual ground as a grounding part. In each experiment, the measurement is conducted for the maximum potential differences between the grounding part and an AC that is generated by conversion of an electronic wave generated a desktop body, and for an initial charge rate.

In Experiment 1, the maximum potential difference between the grounding part and an AC that is generated by conversion of an electronic wave was measured in about 5.8~6.8 V, and an initial charge rate of a voltage stored in a capacitor was measured in about 0.02 V/S.

In Experiment 2, the maximum potential difference between the grounding part and an AC that is generated by conversion of an electronic wave was measured in about 35.28 V, and an initial charge rate of a voltage stored in a capacitor was measured in about 0.5 V/S.

In Experiment 3, the maximum potential difference between the grounding part and an AC that is generated by conversion of an electronic wave was measured in about 108.4 V, and an initial charge rate of a voltage stored in a capacitor was measured in about 2.27 V/S.

In Experiment 4, the maximum potential difference between the grounding part and an AC that is generated by conversion of an electronic wave was measured in about 99.6 V, and an initial charge rate of a voltage stored in a capacitor was measured in about 1.26 V/S.

From Experiment 1 to Experiment 4, it can be seen that the maximum potential difference between a grounding part and an AC that is generated by conversion of an electronic wave may be modulated according to a kind of grounding part which provides a ground to a capacitor. Additionally, it can be seen that as the maximum potential difference between a grounding part and an AC that is generated by conversion of an electronic wave increases, an initial charge rate of a voltage stored in a capacitor may increase. Accordingly, according to a kind of grounding part which provides a ground to a capacitor, it may be allowable to modulate a charge rate of electric energy stored in the capacitor.

Figure 8:
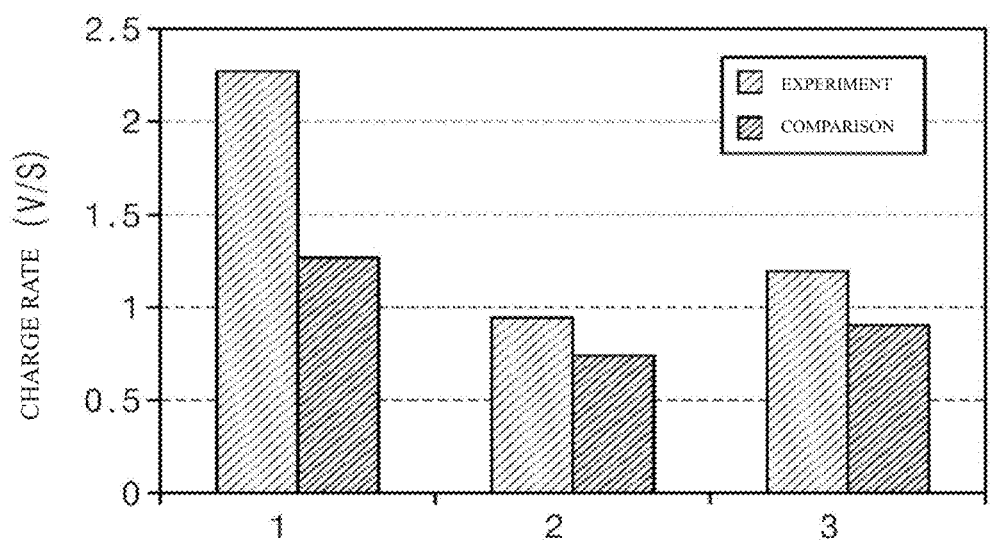
FIG. 8 a graphic diagram showing an initial charge rate of a voltage stored in a capacitor of an energy conversion and storage apparatus using an electronic wave in accordance with an embodiment of the inventive concept, diversifying a kind of grounding part into an outlet ground and a virtual ground in the circuit diagram described in conjunction with FIG. 3.

FIG. 8 a graphic diagram showing an initial charge rate of a voltage stored in a capacitor of an energy conversion and storage apparatus using an electronic wave in accordance with an embodiment of the inventive concept, diversifying a kind of grounding part into an outlet ground and a virtual ground in the circuit diagram described in conjunction with FIG. 3.

Referring to FIG. 8, Experiment 1 to Experiment 3 use the grounding part as the outlet ground in the circuit diagram described with FIG. 3, and Comparison 1 to Comparison 3 use the grounding part as the virtual ground in the circuit diagram described with FIG. 3.

Experiment 1 and Comparison 1 represents initial charge rates of a voltage that is rectified from an AC, which is converted from an electronic wave generated from a computer with power consumption rate of 400 W, and stored in a capacitor. Experiment 2 and Comparison 2 represents initial charge rates of a voltage that is rectified from an AC, which is converted from an electronic wave generated from a microwave oven with power consumption rate of 1050 W, and stored in a capacitor. Experiment 3 and Comparison 3 represents initial charge rates of a voltage that is rectified from an AC, which is converted from an electronic wave generated from a television with power consumption rate of 100 W, and stored in a capacitor.

In Experiment 1 and Comparison 1, the initial charge rates were measured respectively in 2.27 V/S and 1.26 V/S. In Experiment 2 and Comparison 2, the initial charge rates were measured respectively in 0.95 V/S and 0.75 V/S. In Experiment 3 and Comparison 3, the initial charge rates were measured respectively in 1.2 V/S and 0.9 V/S. From Experiments and Comparisons, it can be seen that using the grounding part as an outlet ground is higher in an initial charge rate than using the grounding part as a virtual ground.

Figure 9:
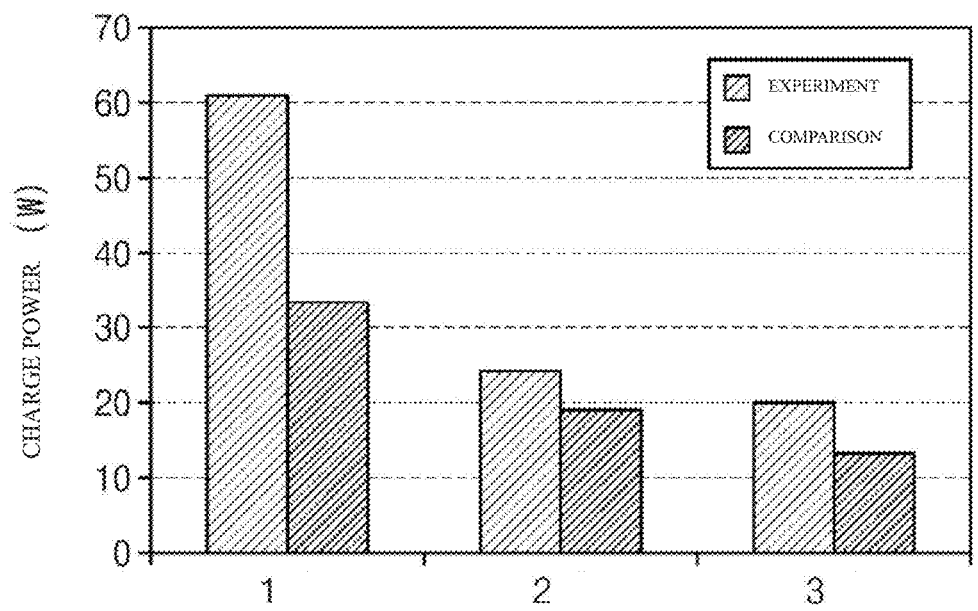
FIG. 9 is a graphic diagram showing a result of measuring power generated when an electronic-wave energy conversion and storage apparatus, which has been charged, is being discharged in accordance with an embodiment of the inventive concept, diversifying a kind of grounding part into an outlet ground and a virtual ground in the circuit diagram described in conjunction with FIG. 3.

FIG. 9 is a graphic diagram showing a result of measuring power generated when an electronic-wave energy conversion and storage apparatus, which has been charged, is being discharged in accordance with an embodiment of the inventive concept, diversifying a kind of grounding part into an outlet ground and a virtual ground in the circuit diagram described in conjunction with FIG. 3.

Referring to FIG. 9, power was measured through Comparison 1 to Comparison 3 and Experiment 1 to Experiment 3 which are described with FIG. 7.

In Experiment 1 and Comparison 1, power was measured respectively in 61 W and 33.7 W. In Experiment 2 and Comparison 2, power was measured respectively in 24.3 W and 19.5 W. In Experiment 3 and Comparison 3, power was measured respectively in 20 W and 13.7 W. From Experiments and Comparisons, it can be seen that using the grounding part as an outlet ground is higher in power than using the grounding part as a virtual ground.

Now an energy conversion and storage apparatus using an electronic wave generated from a power transport apparatus will be described hereafter.

Figure 10:
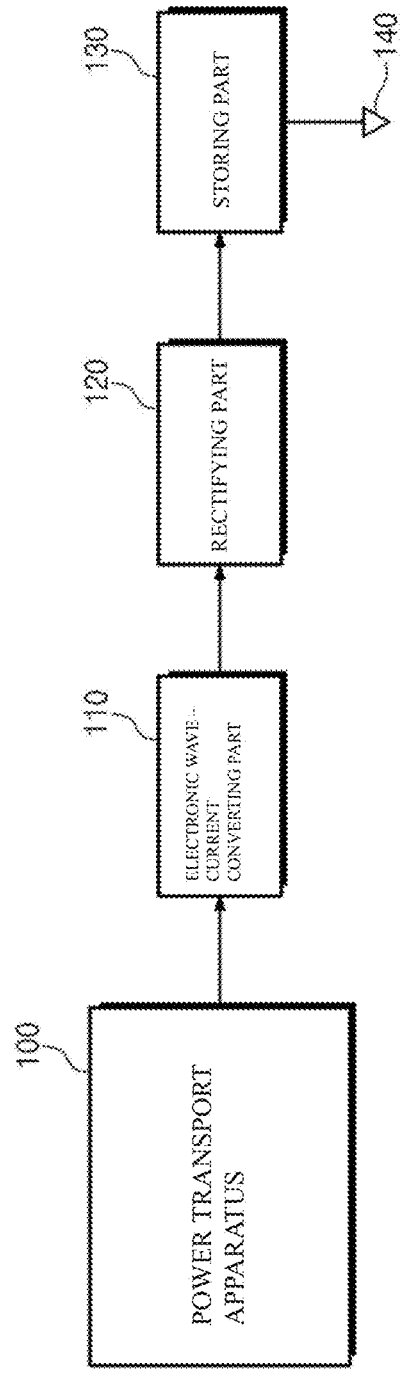
FIG. 10 is a block diagram illustrating an energy conversion and storage apparatus using an electronic wave generated from a power transport apparatus in accordance with an embodiment of the inventive concept.

FIG. 10 is a block diagram illustrating an energy conversion and storage apparatus using an electronic wave generated from a power transport apparatus in accordance with an embodiment of the inventive concept.

Referring to FIG. 10, an energy conversion and storage apparatus using an electronic wave generated from a power transport apparatus in accordance with an embodiment of the inventive concept, as described with FIG. 1, may include an electronic wave-current converting part 110, a rectifying part 120, and a storing part 130.

The electronic wave-current converting part 110 may convert an electronic wave, which is generated from a power transport apparatus 100, into an AC. For example, the power transport apparatus 100 may include power transport towers, and/or a power transport line connecting the power transport towers. According to an embodiment, the electronic wave-current converting part 110 may be shaped in a mesh or sheet made of a conductive material. The conductive material may include at least one of a metal (e.g., aluminum) or conductive polymer.

The AC may be a surface current generated through the mechanism for which an electronic wave generated from the power transport apparatus meets a conductive material (the electronic wave-current converting part 110). The surface current may flow along the surface of the conductive material (the electronic wave-current converting part 110). For example, the AC may be a current, for which an electronic wave generated from a power transport tower and/or a power transport line is converted into a surface current, flowing into a ground.

The rectifying part 120, as described with FIG. 1, may rectify an AC that is converted through the electronic wave-current converting part 110. The rectifying part 120 may transmit the rectified AC to the storing part 130. The storing part 130, as described with FIG. 1, may receive a ground from the grounding part 140 and may store the rectified AC as electric energy.

As described above, the power transport apparatus may include a power transport tower and/or a power transport line, and the electronic wave-current converting part may be safely disposed adjacent to the power transport apparatus to allow an electronic wave, which is generated from the power transport apparatus, to be converted into an AC. An electronic wave-current converting part included in an energy conversion and storage apparatus using an electronic wave, which is generated from a power transport apparatus, according to various embodiments of the inventive concept will be described hereafter.

Figure 11:
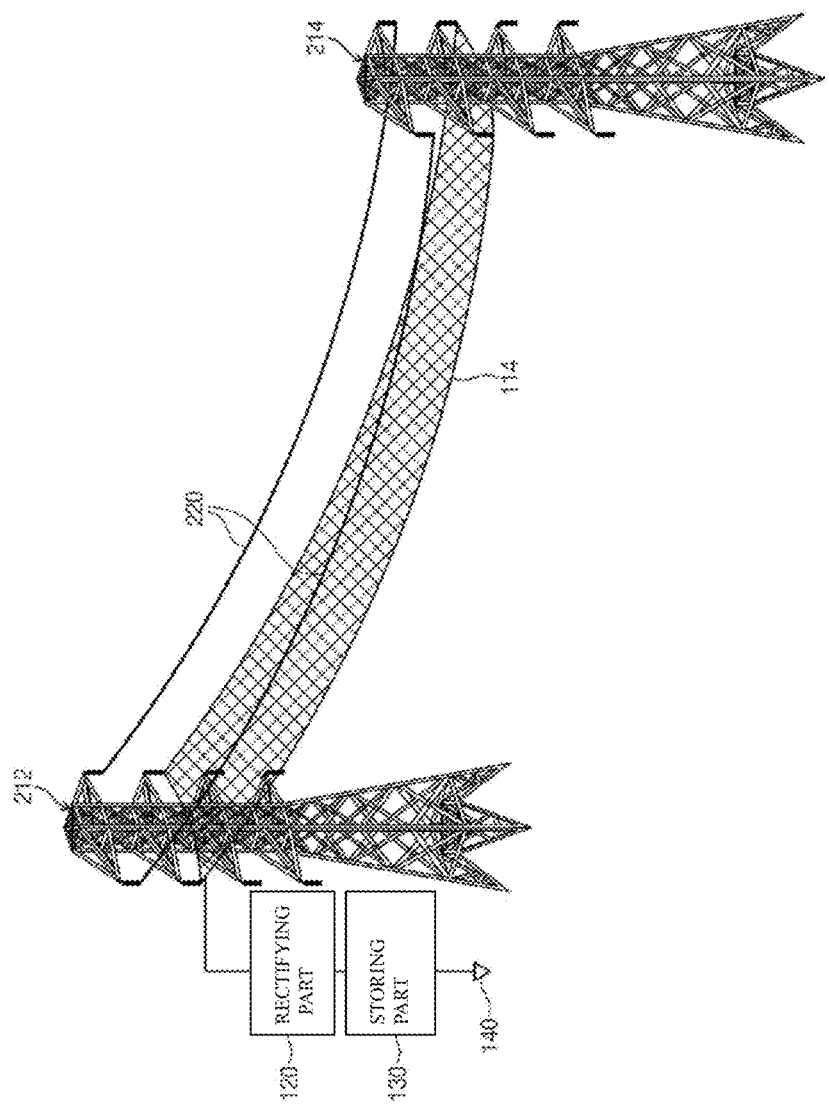
FIG. 11 illustrates an electronic wave-current converting part of an energy conversion and storage apparatus using an electronic wave generated from a power transport apparatus in accordance with a first embodiment of the inventive concept.

FIG. 11 illustrates an electronic wave-current converting part of an energy conversion and storage apparatus using an electronic wave generated from a power transport apparatus in accordance with a first embodiment of the inventive concept.

Referring to FIG. 11, an energy conversion and storage apparatus using an electronic wave generated from a power transport apparatus in accordance with a first embodiment of the inventive concept may include an electronic wave-current converting part 114 to convert electronic waves, which are generated from the power transport apparatus 212, 213, or 220, into an AC, a rectifying part 120 to rectify the AC converted through the electronic wave-current converting part 114, and a storing part 130 to store the rectified AC and to receive a ground from a grounding part 140.

The power transport apparatus 212, 214, or 220 may include a first power transport tower 212, a second power transport tower 214 isolated from the first power transport tower 212, and a power transport line 220 connected to the first power transport tower 212 and the second power transport tower 214.

The electronic wave-current converting part 114 may be shaped in a mesh made of a conductive material (e.g., metal or conductive polymer). The electronic wave-current converting part 114 may be disposed adjacent to the power transport line 220 to convert an electronic wave, which is generated from the power transport line 220, into an AC. For example, the electronic wave-current converting part 114 may be connected to the first power transport tower 212 and the second power transport tower 214, and may be disposed under the power transport line 220, being elongated toward a direction of elongating the power transport line 220.

The electronic wave-current converting part 114 may correspond to the electronic wave-current converting part 112 which is described with FIG. 3. The rectifying part 120 may include first to fourth diodes 121, 122, 123, and 124 as described with FIG. 3. The storing part 130 may include a capacitor 132 as described with FIG. 3 and the grounding part 140 may correspond to the grounding part 142 which is described with FIG. 3.

The electronic wave-current converting part 114 may include an outer frame, and an inner frame of a mesh structure connected with the outer frame. This structure will described with reference to FIG. 12.

Figure 12:
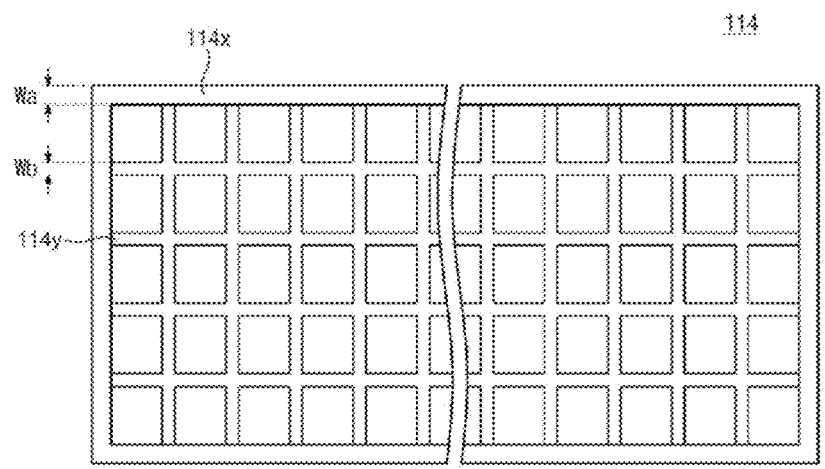
FIG. 12 explosively illustrates the electronic wave-current converting part of FIG. 11.

FIG. 12 explosively illustrates the electronic wave-current converting part of FIG. 11.

Referring to FIG. 12, the electronic wave-current converting part 114 may include an outer frame 114$x$ and an inner frame 114$y$ disposed in the outer frame 114$x$. A width Wa of the outer frame 114$x$ may be wider than a width Wb of the inner frame 114$y$. For example, the width Wa of the outer frame 114$x$ may be 1~3 cm and the width Wb of the inner frame 114$y$ may be 0.1~0.2 cm.

The outer frame 114$x$ may be shaped in a tetragon and the width Wa of the outer frame 114$x$ may be substantially uniform. The inner frame 114$y$ may be structured in a mesh which is surrounded by the outer frame 114$x$. The outer frame 114$x$ may include a plurality of first segment group elongated toward a first direction, and a plurality of second segment group elongated toward a second direction intersecting the first direction. The width Wb of the inner frame 114$y$ may be uniform substantially. A first segment group and a second segment group of the inner frame 114$y$ may form tetragonal spaces. The tetragonal spaces may be arranged in the first direction and the second direction. Areas of the tetragonal spaces may be uniform substantially. For example, an area of the tetragonal may be about 1 cm2.

The outer frame 114$x$ may function as a loop antenna and may mostly receive a magnetic field of an electronic wave generated from the power transport apparatus 212, 214, or 220 which is described with FIG. 11. The inner frame 114$y$ may mostly receive an electric field of an electronic wave generated from the power transport apparatus 212, 214, or 220 which is described with FIG. 11.

Different from the energy conversion and storage apparatus using an electronic wave in accordance with the first embodiment of the inventive concept described with FIG. 11, an energy conversion and storage apparatus using an electronic wave generated from a power transport apparatus in accordance with a second embodiment of the inventive concept may include a sheet-shaped electronic wave-current converting part. Hereafter, an energy conversion and storage apparatus using an electronic wave generated from a power transport apparatus in accordance with a second embodiment of the inventive concept will be described in conjunction with FIG. 13.

Figure 13:
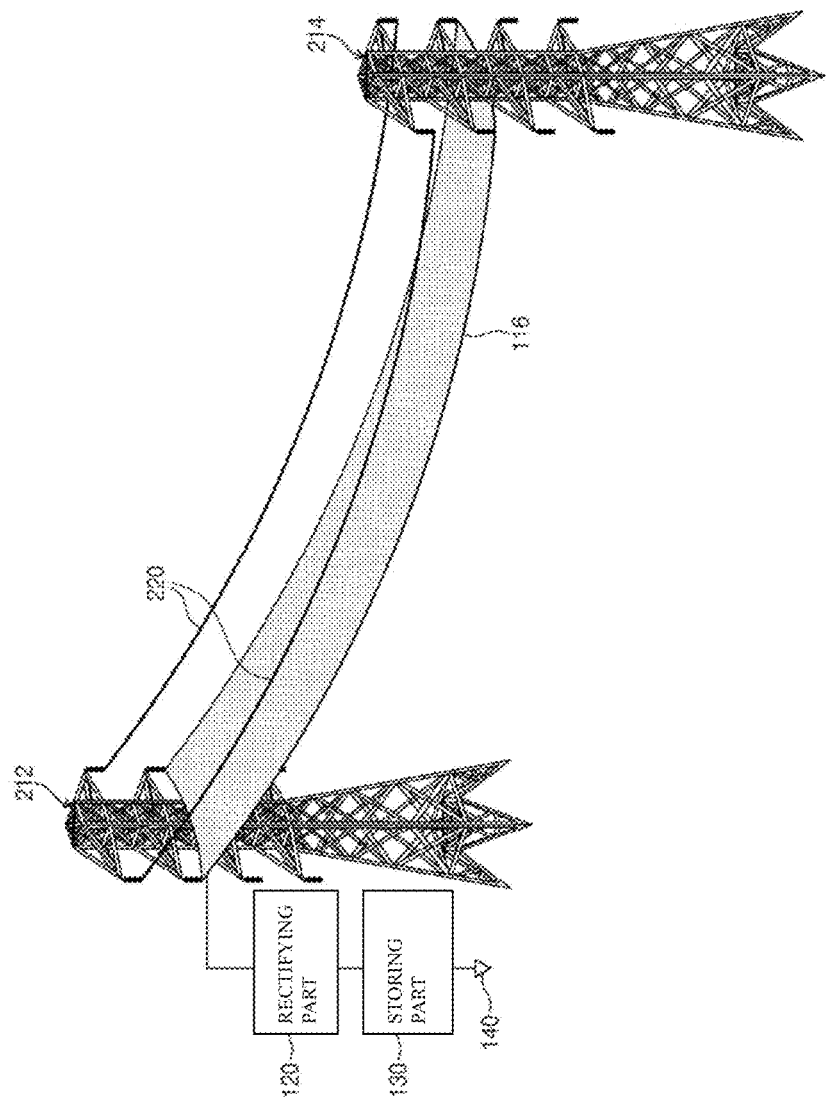
FIG. 13 illustrates an electronic wave-current converting part of an energy conversion and storage apparatus using an electronic wave generated from a power transport apparatus in accordance with a second embodiment of the inventive concept.

FIG. 13 illustrates an electronic wave-current converting part of an energy conversion and storage apparatus using an electronic wave generated from a power transport apparatus in accordance with a second embodiment of the inventive concept.

Referring to FIG. 13, an electronic wave generated from a power transport apparatus in accordance with a second embodiment of the inventive concept may include an electronic wave-current converting part 116 to convert electronic waves, which are generated from the power transport apparatus 212, 213, or 220, into an AC, a rectifying part 120 to rectify the AC converted through the electronic wave-current converting part 116, and a storing part 130 to store the rectified AC and to receive a ground from a grounding part 140. Different from the electronic wave-current converting part 114 described with FIG. 12, the electronic wave-current converting part 116 may be shaped in a sheet made of a conductive material.

The electronic wave-current converting part 116 may correspond to the electronic wave-current converting part 112 which is described with FIG. 3. The rectifying part 120 may include first to fourth diodes 121, 122, 123, and 124 as described with FIG. 3. The storing part 130 may include a capacitor 132 as described with FIG. 3 and the grounding part 140 may correspond to the grounding part 142 which is described with FIG. 3.

Different from the energy conversion and storage apparatus using an electronic wave in accordance with the first embodiment or the second embodiment, an energy conversion and storage apparatus using an electronic wave in accordance with a third embodiment of the inventive concept may include an electronic wave-current converting part which is placed on a power transport line. Hereafter, an energy conversion and storage apparatus using an electronic wave generated from a power transport apparatus in accordance with a third embodiment of the inventive concept will be described in conjunction with FIG. 14.

Figure 14:
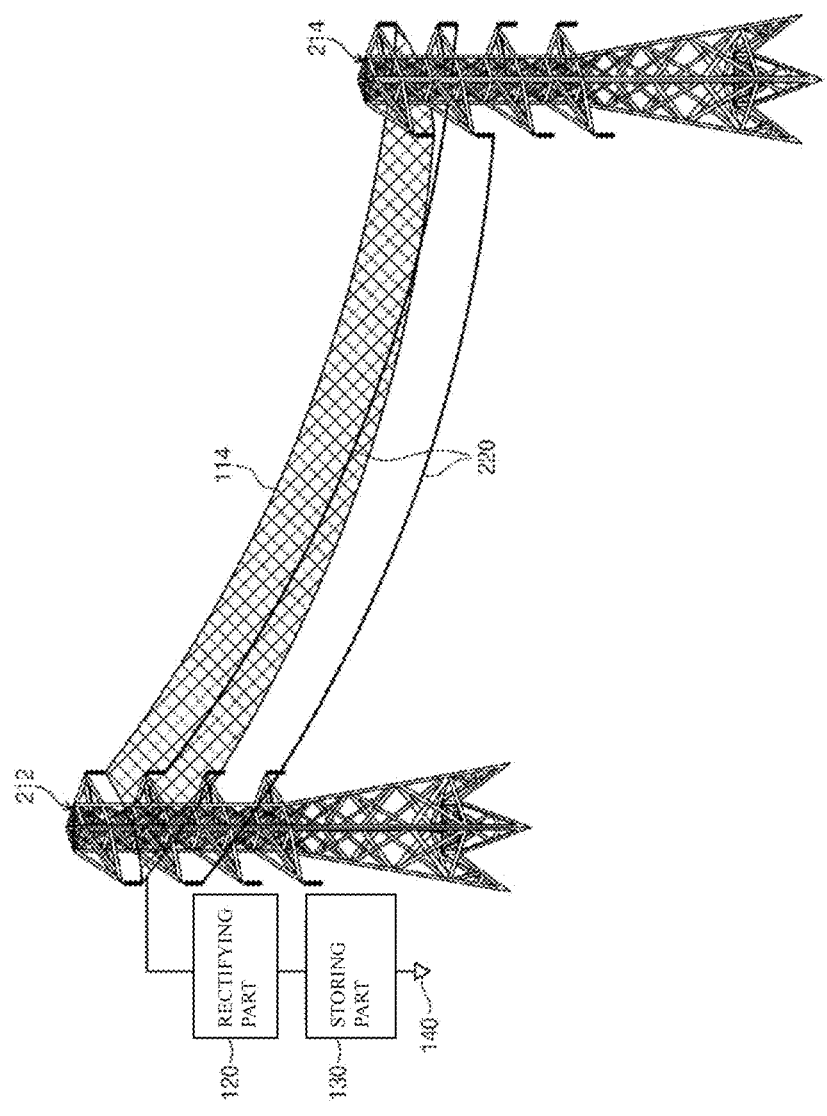
FIG. 14 illustrates an electronic wave-current converting part of an energy conversion and storage apparatus using an electronic wave generated from a power transport apparatus in accordance with a third embodiment of the inventive concept.

FIG. 14 illustrates an electronic wave-current converting part of an energy conversion and storage apparatus using an electronic wave generated from a power transport apparatus in accordance with a third embodiment of the inventive concept.

Referring to FIG. 14, an electronic wave generated from a power transport apparatus in accordance with a third embodiment of the inventive concept may include an electronic wave-current converting part 114 to convert electronic waves, which are generated from the power transport apparatus 212, 213, or 220, into an AC, a rectifying part 120 to rectify the AC converted through the electronic wave-current converting part 114, and a storing part 130 to store the rectified AC and to receive a ground from a grounding part 140. As described with FIG. 11, the electronic wave-current converting part 114 may be shaped in a mesh made of a conductive material and may be disposed on the power transport line 220.

Different from this, an energy conversion and storage apparatus using an electronic wave generated from a power transport apparatus in accordance with a first modification of a third embodiment of the inventive concept, as described with FIG. 13, may include an electronic wave-current converting part which is shaped in a sheet made of a conductive material and placed on the power transport line 220.

Different from this, an energy conversion and storage apparatus using an electronic wave generated from a power transport apparatus in accordance with a second modification of a third embodiment of the inventive concept may further include an electronic wave-current converting part which is shaped in a mesh or sheet disposed under the power transport line 220.

Different from the first to third embodiments, an energy conversion and storage apparatus using an electronic wave generated from a power transport apparatus in accordance with a fourth embodiment of the inventive concept may include a plurality of electronic wave-current converting parts in correspondence with a plurality of power transport lines. Hereafter, an energy conversion and storage apparatus using an electronic wave generated from a power transport apparatus in accordance with a fourth embodiment of the inventive concept will be described in conjunction with FIG. 15.

Figure 15:
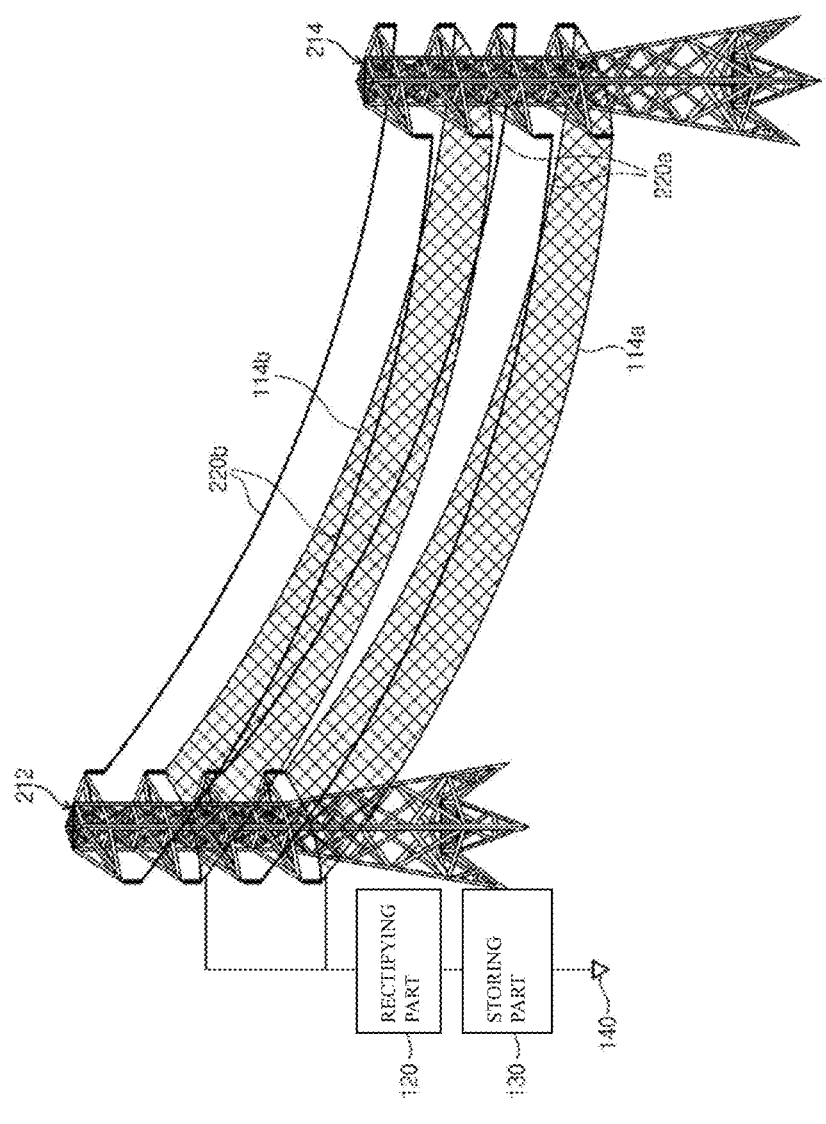
FIG. 15 illustrates an electronic wave-current converting part of an energy conversion and storage apparatus using an electronic wave generated from a power transport apparatus in accordance with a fourth embodiment of the inventive concept.

FIG. 15 illustrates an electronic wave-current converting part of an energy conversion and storage apparatus using an electronic wave generated from a power transport apparatus in accordance with a fourth embodiment of the inventive concept.

Referring to FIG. 15, an energy conversion and storage apparatus using an electronic wave generated from a power transport apparatus in accordance with a fourth embodiment of the inventive concept may include electronic wave-current converting parts 114a and 114b to convert electronic waves, which are generated from the power transport apparatus 212, 214, 220a, or 220b, into an AC, a rectifying part 120 to rectify the AC converted through the electronic wave-current converting parts 114a and 114b, and a storing part 130 to store the rectified AC and to receive a ground from a grounding part 140.

The power transport apparatus 212, 214, 220a, or 220b may include a first power transport tower 212 and a second power transport tower which are isolated each other, a first power transport line 220a connected to the first and second power transport towers 212 and 214, and a second power transport line 220b connected to the first and second power transport towers 212 and 214 and placed over the first power transport line 220a.

A first electronic wave-current converting part 114a may be disposed under the first power transport line 220a and a second electronic wave-current converting part 114b may be disposed between the first power transport line 220a and the second power transport line 220b. The first and second electronic wave-current converting parts 114a and 114b may be connected to the first and second power transport towers 212 and 214 and may be elongated toward a direction of elongating the first and second power transport lines 220a and 220b. The first and second electronic wave-current converting parts 114a and 114b may be shaped in meshes made of a conductive material. Otherwise, as illustrated in FIG. 15, the first and second electronic wave-current converting parts 114a and 114b, as described with FIG. 13, may be shaped in sheets made of a conductive material.

The rectifying part 120 and the storing part 130 may be connected with the first and second electronic wave-current converting parts 114a and 114b, rectifying an AC that is converted through the first and second electronic wave-current converting parts 114a and 114b, and may store the rectified AC.

The first and second electronic wave-current converting parts 114a and 114b may correspond to the electronic wave-current converting part 112 which is described with FIG. 3, and the rectifying part 120 may include first to fourth diodes 121, 122, 123, and 124 as described with FIG. 3. The storing part 130 may include a capacitor 132 as described with FIG. 3 and the grounding part 140 may correspond to the grounding part 142 which is described with FIG. 3.

Different from a fourth embodiment of the inventive concept, in the case of providing a plurality of electronic wave-current converting parts as described with reference to FIG. 15, an energy conversion and storage apparatus using an electronic wave generated from a power transport apparatus in accordance with a fifth embodiment of the inventive concept may include pluralities of rectifying parts and storing parts in correspondence with a plurality of electronic wave-current converting parts. Hereafter, an energy conversion and storage apparatus using an electronic wave generated from a power transport apparatus in accordance with a fifth embodiment of the inventive concept will be described in conjunction with FIG. 16.

Figure 16:
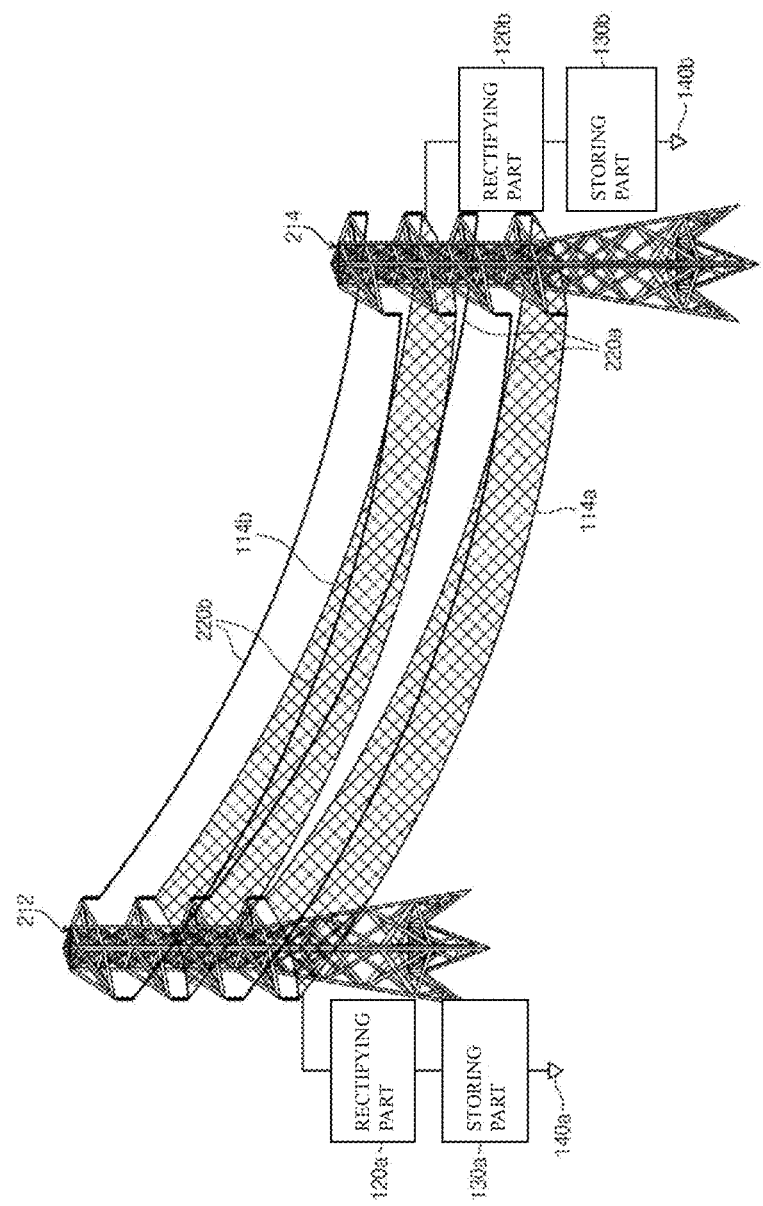
FIG. 16 illustrates an energy conversion and storage apparatus using an electronic wave generated from a power transport apparatus in accordance with a fifth embodiment of the inventive concept.

FIG. 16 illustrates an energy conversion and storage apparatus using an electronic wave generated from a power transport apparatus in accordance with a first embodiment of the inventive concept.

Referring to FIG. 16, an energy conversion and storage apparatus using an electronic wave generated from a power transport apparatus in accordance with a fifth embodiment of the inventive concept may include electronic wave-current converting parts 114a and 114b to convert electronic waves, which are generated from the power transport apparatus 212, 214, 220a, or 220b, into an AC, rectifying parts 120a and 120b to rectify the AC converted through the electronic wave-current converting parts 114a and 114b, and storing parts 130a and 130b to store the rectified AC and to receive grounds from grounding parts 140a and 140b.

The power transport apparatus 212, 214, 220a, or 220b, as described with FIG. 7, may include a first power transport tower 212 and a second power transport tower 214 which are isolated each other, a first power transport line 220a connected to the first and second power transport towers 212 and 214, and a second power transport line 220b connected to the first and second power transport towers 212 and 214 and placed over the first power transport line 220a.

The first electronic wave-current converting parts 114a and 114b, as described with FIG. 15, may be disposed under the first power transport line 220a and between the first power transport line 220a and the second transport line 220b, respectively. The first and second electronic wave-current converting parts 114a and 114b may be shaped in meshes made of a conductive material. Otherwise, as illustrated in FIG. 16, the first and second electronic wave-current converting parts 114a and 114b, as described with FIG. 13, may be shaped in sheets made of a conductive material.

The plurality of electronic wave-current converting parts 114a and 114b may be connected with the plurality of rectifying parts 120a and 120b and the plurality of storing parts 130a and 130b, respectively. In other words, one electronic wave-current converting part may be connected with one rectifying part and one storing part.

In detail, the first rectifying part 120a may be connected with the first electronic wave-current converting part 114a to rectify an AC which is converted through the first electronic wave-current converting part 114a. A first storing part 130a may store an AC, which is rectified through the first rectifying part 120a, and may receive a ground from a first grounding part 140a. A second rectifying part 120b may be connected with the second electronic wave-current converting part 114b to rectify an AC which is converted through the second electronic wave-current converting part 114b. The second storing part 130b may store an AC, which is rectified through the second rectifying part 120b, and may receive a ground from a second grounding part 140b.

The first and second electronic wave-current converting parts 114a and 114b may correspond to the electronic wave-current converting part 112 which is described with FIG. 3. The first and second rectifying parts 120a and 120b may include first to fourth diodes 121, 122, 123, and 124 as described with FIG. 3. The first and second storing parts 130a and 130b may include capacitors 132 as described with FIG. 3. The grounding parts 140a and 140b may correspond to the grounding part 142 which is described with FIG. 3.

In addition to the configurations illustrated in FIGS. 11 to 16, an electronic wave-current converting part may be disposed adjacent to a power transport apparatus in various ways to convert an electronic wave that is generated from the power transport apparatus.

The rectifying part and the storing part of the energy conversion and storage apparatus described with FIGS. 1, 3 to 6, 10, 11, and 13 to 16 may receive grounds which are generated from a voltage received from an external source. An energy conversion and storage apparatus using an electronic wave, which receives a ground from a ground providing part generating the ground from a voltage received from an external source, will be described hereafter.

Figure 17:
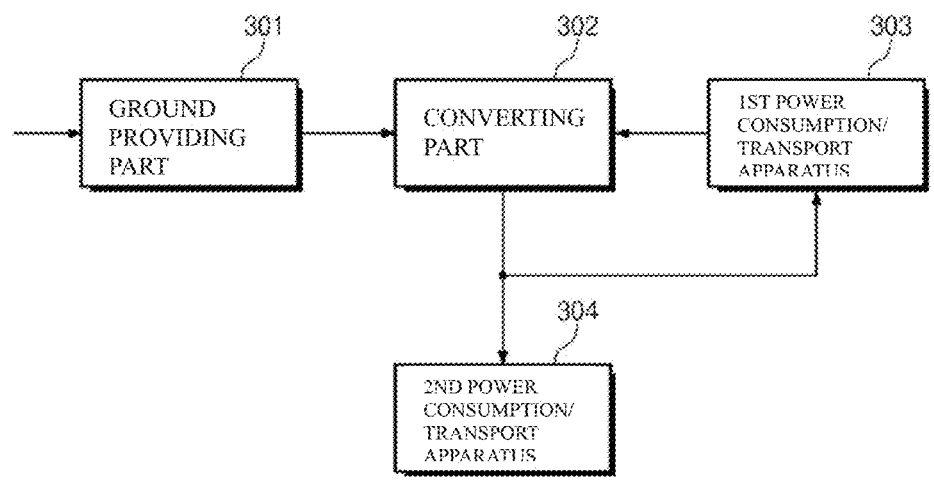
FIG. 17 illustrates an energy conversion and storage apparatus receiving a ground from a ground providing part in accordance with an embodiment of the inventive concept.

FIG. 17 illustrates an energy conversion and storage apparatus receiving a ground from a ground providing part in accordance with an embodiment of the inventive concept.

An energy conversion and storage apparatus receiving a ground from a ground providing part in accordance with an embodiment of the inventive concept may include a ground providing part 301 and a converting part 302. The ground providing part 301 may use a voltage, which is received from an external source, to generate a ground and may provide the generated ground to the converting part 302. According to an embodiment, an AC voltage of 220 V or 110 V is input into the ground providing part 201 and then the ground providing part 301 may generate a ground from the AC voltage. For example, the ground providing part 301 may be connected with an outlet to receive the AC voltage from the outlet.

The converting part 302 may receive a ground from the ground providing part 301. The converting part 302 may receive an AC from a first power consumption/transport apparatus 303 and may rectify and store the received AC as electric energy. The converting part 302 may include the rectifying part 120 and the storing part 130 which are described with FIG. 1.

The converting part 302 and the ground providing part 301 may be integrated in a one-body product.

The AC may be generated by conversion of an electronic wave generated from the first power consumption apparatus 303. The AC may be a surface current generated when an electronic wave generated from the first power consumption/transport apparatus 303 meets a conductive material. The surface current may flow along the surface of the conductive material.

For example, the AC may be a current, for which an electronic wave generated from the first power consumption/transport apparatus 303 (e.g., computer, refrigerator, television, mobile phone, transport tower, or electric wire) is converted into a surface current, flowing into a ground. As another example, the AC may be a current, for which an electronic wave generated from an electronic device in the inside or outside of a building, flowing into a ground of the building.

The converting part 302 may receive a ground from the ground providing part 301 and may rectify and store the AC as electric energy. The stored electric energy may be resupplied to the first power consumption/transport apparatus 303 or may be supplied to a second power consumption/transport apparatus 304 different from the first power consumption/transport apparatus 303. Owing to this, it may be permissible to improve a shielding effect against an electronic wave that is radiated by the power consumption/transport apparatus 303, and to provide an energy conversion and storage apparatus with high efficiency and high reliability.

Hereafter, an energy conversion and storage apparatus receiving a ground from a ground providing part in accordance with an embodiment of the inventive concept will be described in detail.

Figure 18:
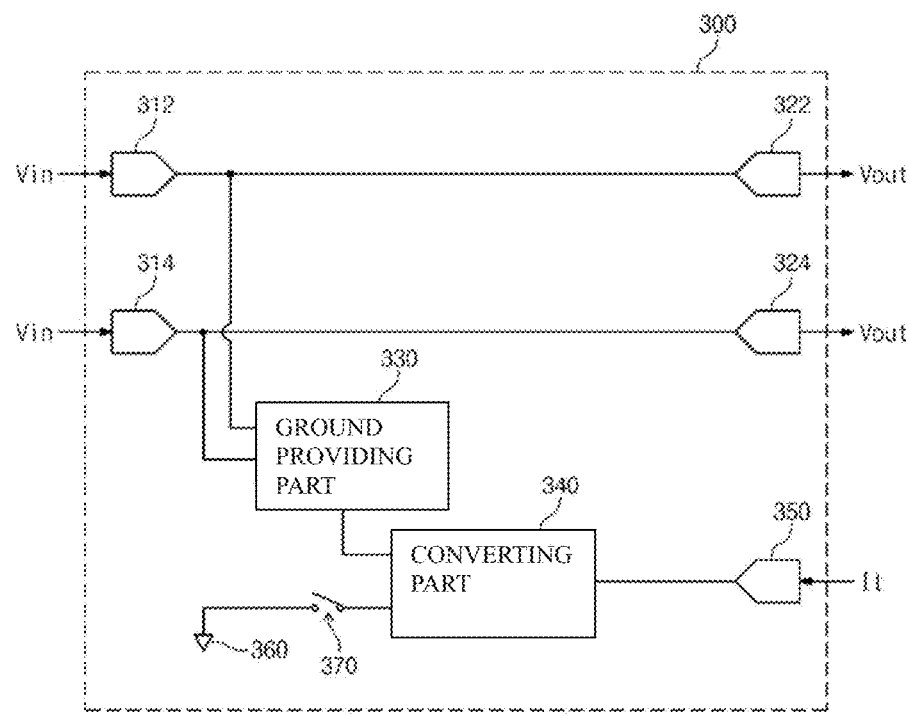
FIG. 18 simply illustrates a circuit of an energy conversion and storage apparatus receiving a ground from a ground providing part in accordance with an embodiment of the inventive concept.
Figure 19:
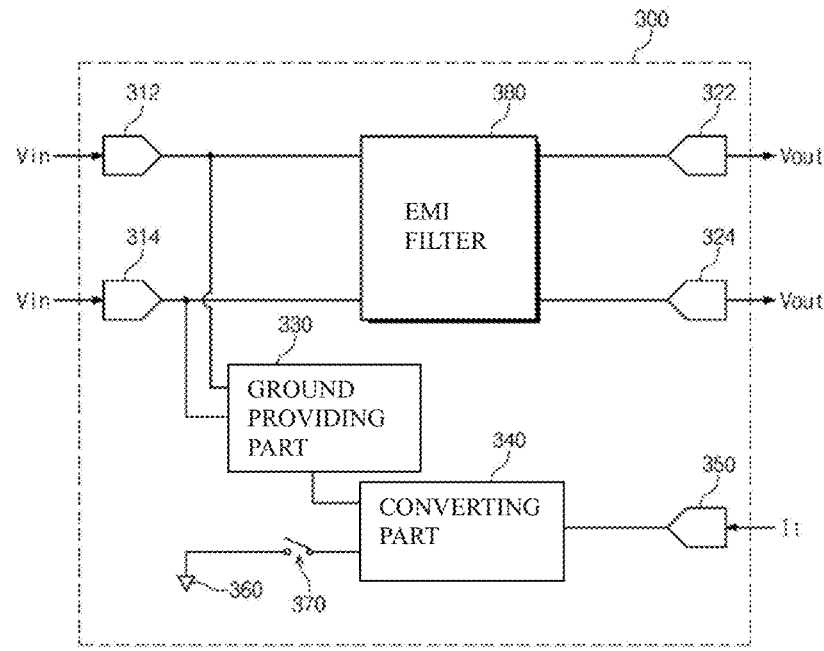
FIG. 19 simply illustrates a circuit of an energy conversion and storage apparatus receiving a ground from a ground providing part in accordance with a modification of an embodiment of the inventive concept.

FIG. 18 simply illustrates a circuit of an energy conversion and storage apparatus receiving a ground from a ground providing part in accordance with an embodiment of the inventive concept, and FIG. 19 simply illustrates a circuit of an energy conversion and storage apparatus receiving a ground from a ground providing part in accordance with a modification of an embodiment of the inventive concept.

Referring to FIG. 18, an energy conversion and storage apparatus 300 receiving a ground from a ground providing part in accordance with an embodiment of the inventive concept may include a first input terminal 312, a second input terminal 314, a first output terminal 322, a second output terminal 324, the ground providing part 330, a converting part 340, a current input terminal 350, a ground connecting part 360, and a switching element 370.

The first and second input terminals 312 and 314 may receive a voltage Vin that is supplied from an external source. According to an embodiment, the first and second input terminals 312 and 314 may be connected with an outlet to receive an AC voltage of 110 V or 220 V thereat.

The first and second output terminals 322 and 324 may be connected respectively with the first and second input terminals 312 and 314 to output the voltage Vin, which is received through the first and second input terminals 312 and 314, to the outside. According to an embodiment, the first and second output terminals 322 and 324 may be connected with a power consumption/transport apparatus, which consumes or transports power, to transmit the voltage Vin, which is received through the first and second input terminals 312 and 314, to the power consumption/transport apparatus.

The ground providing part 330 may be connected with the first and second input terminals 312 and 314 to generate a ground by using a voltage that is received through the first and second input terminals 312 and 314 from an external source. The generated ground may be provided to the converting part 340.

The current input terminal 350 may receive It from an external source. The current input terminal 350 may be connected with a ground terminal of the power consumption/transport apparatus connected with the first and second output terminals 322 and 324. In this configuration, the current It input to the current input terminal 350 may flow into the current input terminal 350 from the ground terminal of the plug of the power consumption/transport apparatus. According to an embodiment, the current It flowing into the current input terminal 350 may include an AC that is converted from an electronic wave generated from the power consumption/transport apparatus connected with the first and second output terminals 322 and 324.

The ground connecting part 360 may be connected with an external grounding part. According to an embodiment, the ground connecting part 360 may be connected with a grounding part of an outlet to receive a ground from the grounding part of the outlet.

The switching element 370 may connect the ground connecting part 360 with the converting part 340. The switching element 370 may be manually open or closed by a user who uses an energy conversion and storage apparatus 300 receiving a ground from a ground providing part according to an embodiment of the inventive concept.

The converting part 340 may receive a ground from the ground connecting part 360 and/or the ground providing part 330, and may be connected with the current input terminal 350 to rectify and store the current It, which is supplied from the external source, as electric energy. The converting part 340 may transmit the stored electric energy to the power consumption/transport apparatus or another power consumption/transport apparatus.

An energy conversion and storage apparatus receiving a ground from a ground providing part according to a modification of an embodiment of the inventive concept, for removing noise, as illustrated in FIG. 3, may further include an EMI filter 380 to connect the first and second input terminals 312 and 314 with the first and second output terminals 322 and 324.

Figure 20:
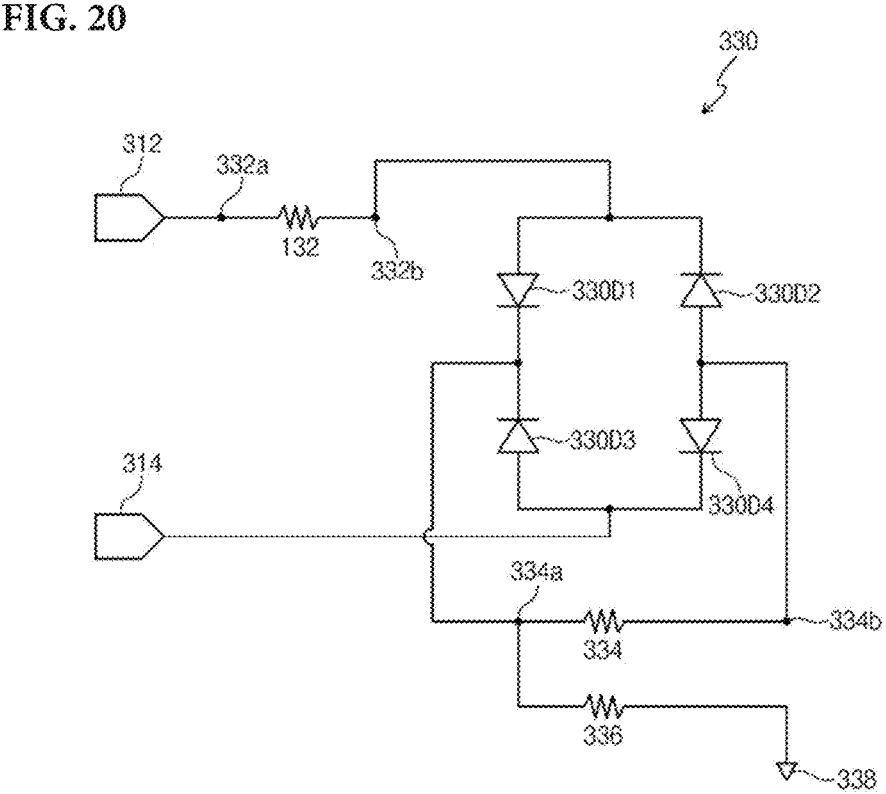
FIG. 20 is a circuit diagram illustrating a ground providing part of an energy conversion and storage apparatus receiving a ground from the ground providing part in accordance with an embodiment of the inventive concept.

Hereafter, the ground providing part 330 described with FIGS. 18 and 19 will be more detailed in conjunction with FIG. 20.

FIG. 20 is a circuit diagram illustrating a ground providing part of an energy conversion and storage apparatus receiving a ground from the ground providing part in accordance with an embodiment of the inventive concept.

Referring to FIG. 20, the ground providing part 330 described with FIGS. 18 and 19 may include first to third resistors 332, 334, and 336, first to fourth diodes 330D1, 330D2, 330D3, and 330D4, and a ground terminal 338 to which a ground is provided.

One end 332a of the first resistor 332 may be connected to the first input terminal 312. The other end 332b of the first resistor 332 may be connected with an anode of the first diode 330D1 and a cathode of the second diode 330D2.

A cathode of the first diode 330D1 may be connected with one end 334a of the second resistor 334 and a cathode of the third diode 330D3. The anode of the first anode 330D1 may be connected with the other end 332b of the first resistor 332 and a cathode of the second diode 330D2.

The cathode of the second diode 330D2 may be connected with the other end 332b of the first resistor 332 and the anode of the first diode 330D1. An anode of the second diode 330D2 may be connected with the other end 334b of the second resistor 334 and an anode of the fourth diode 330D4.

The cathode of the third diode 330D3 may be connected with the cathode of the first diode 330D1 and the one end 334a of the second resistor 334. An anode of the third diode 330D3 may be connected with the second input terminal 314 and a cathode of the fourth diode 330D4.

The cathode of the fourth diode 330D4 may be connected with the anode of the third diode 330D3 and the second input terminal 314. The anode of the fourth diode 330D4 may be connected with the anode of the second diode 330D2 and the other end 334b of the second resistor 334.

The one end 334a of the second resistor 334 may be connected with the cathode of the first diode 330D1 and the cathode of the third diode 330D3. The other end 334b of the second resistor 334 may be connected with the anode of the second diode 330D2 and the anode of the fourth diode 330D4.

One end of the third resistor 336 may be connected with the one end 334a of the second resistor 334 and the other end of the third resistor 336 may be connected with a ground terminal 338 to which a ground is provided. The third resistor 336 may prevent an abnormal current, an excessive current, or noise from flowing thereinto.

The ground terminal 338 may be connected with the converting part 340 described with FIGS. 18 and 19. The ground providing part 330 may provide a ground to the converting part 340.

In the case that the first and second input terminals 312 and 314 are connected with an external outlet to receive an AC, for example, in the case that a power line is placed at the first input terminal 312, the voltage may be mostly applied to the first resistor 332 and the second resistor 334. A (+)-polarized current may pass the first diode 330D1 and may flow into the one end 334a of the second resistor 334. A (−)-polarized current may pass the second diode 330D2 and may flow into the other end 334b of the second resistor 334. In this case, the (+)-polarized current flowing into the one end 334a of the second resistor 334 is opposite in phase to the (−)-polarized current flowing into the other end 334b of the second resistor 334. Then, a ground may be provided to the ground terminal 338. As another example, in the case that a power line is placed at the second input terminal 314, a voltage may be mostly applied to the second resistor 334. A (+)-polarized current may pass the third diode 330D3 and may flow into the one end 334a of the second resistor 334, and a (−)-polarized current may pass the fourth diode 330D4 and may flow into the other end 334b of the second resistor 334. In this case, the (+)-polarized current flowing into the one end 334a of the second resistor 334 is opposite in phase to the (−)-polarized current flowing into the other end 334b of the second resistor 334. Then, a ground may be provided to the ground terminal 338.

The converting part 340 described with FIGS. 18 and 19 may receive a ground from the ground providing part 330, and may include a rectifying part including first to fourth diodes 121~124 described with FIG. 3 and a storing part including a capacitor 132. Hereafter, the converting part 340 described with FIGS. 18 and 19 will be described in conjunction with FIG. 21.

Figure 21:
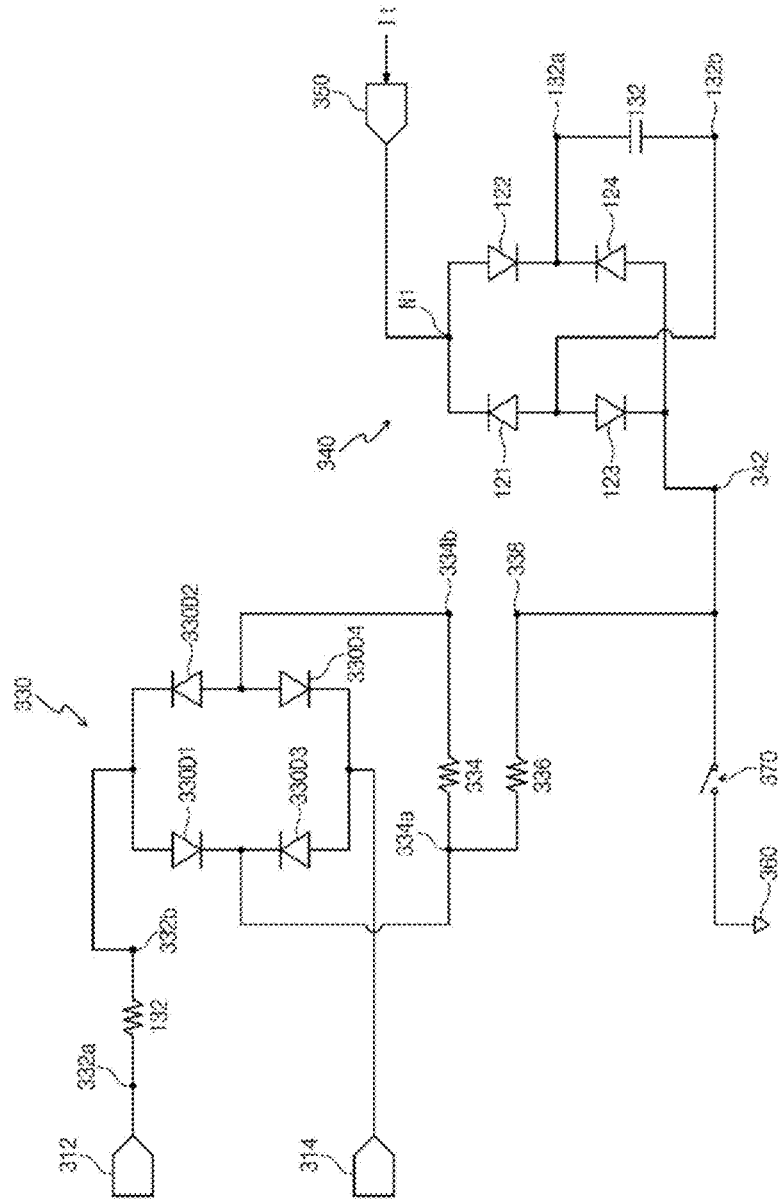
FIG. 21 is a circuit diagram illustrating a converting part of an energy conversion and storage apparatus receiving a ground from a ground providing part in accordance with an embodiment of the inventive concept.

FIG. 21 is a circuit diagram illustrating a converting part of an energy conversion and storage apparatus receiving a ground from a ground providing part in accordance with an embodiment of the inventive concept.

Referring to FIG. 21, the converting part 340 described with FIGS. 18 and 19 may include a rectifying part including first to fourth diodes 121, 122, 123, and 124 which are described with FIG. 3, and a storing part 142 including a capacitor 132.

The current input terminal 350 may receive a current It from an external source. The current It may be input to a first node N1 of the converting part 340. The current It input to the first node N1 may be rectified through the rectifying part and then may be stored as electric energy.

As described with FIG. 18, the current input terminal 350 may be connected with a ground terminal of a plug of the power consumption/transport apparatus connected with the first and second output terminals 332 and 324. In this case, the current It input to the current input terminal 350 may flow into the current input terminal 350 from the ground terminal of the plug of the power consumption/transport apparatus. According to an embodiment, the current It input to the current input terminal 350 may include an AC that is converted from an electronic wave generated from the power consumption/transport apparatus connected with the first and second output terminals 322 and 324.

A cathode of the first diode 121 may be connected with the first node N1. An anode of the second diode 122 may be connected with the first node N1. A cathode of the second diode 122 may be connected with one end 132a of the capacitor 132. An anode of the first diode 121 may be connected with the other end 132b of the capacitor 132.

An anode of the third diode 123 may be connected with the anode of the first diode 121. A cathode of the third diode 123 may be connected with a ground receiving node 342 to provide a ground to the cathode of the third diode 123.

A cathode of the fourth diode 124 may be connected with the one end 132a of the capacitor 132. An anode of the fourth diode 124 may be connected with the ground receiving node 342 to provide a ground to the anode of the fourth diode 124.

The first to fourth diodes 121, 122, 123, and 124 may rectify the current It and may transmit the rectified current to the capacitor 132. The capacitor 132 may store the rectified current as electric energy.

In detail, in the case that the current It flowing into the first node N1 is an AC, a (+)-polarized component of the AC may pass the second diode 122 and may be stored in the one end 132a of the capacitor 132. While the (+)-polarized AC is being stored in the capacitor 132, the third diode 123 and the ground receiving node 342 may provide a ground to the other end 132b of the capacitor 132.

A (−)-polarized component of the AC may pass the first diode 121 and may be stored in the other end 132b of the capacitor 132. While the (−)-polarized AC is being stored in the capacitor 132, the fourth diode 124 and the ground receiving node 342 may provide a ground to the one end 132a of the capacitor 132.

The first to fourth diodes 121, 122, 123, and 124 and the ground receiving node 342 may provide a ground to the other end 132b of the capacitor 132 in a section for which the AC is polarized in (+), and may provide a ground to the one end 132a of the capacitor 132 in a section for which the AC is polarized in (−).

Summarily, according to a polarity of the AC, a ground may be switched and provided to one of the one end 132a and the other end 132b of the capacitor 132. In detail, the other end 132b of the capacitor 132 may be provided with a ground in a section for which the AC is polarized in (+), and the one end 132a of the capacitor 132 may be provided with a ground in a section for which the AC is polarized in (−).

The ground receiving node 342 may be connected with the ground providing part 330 and/or the ground connecting part 360, which are described with FIGS. 18 to 20, to receive a ground.

Figure 22:
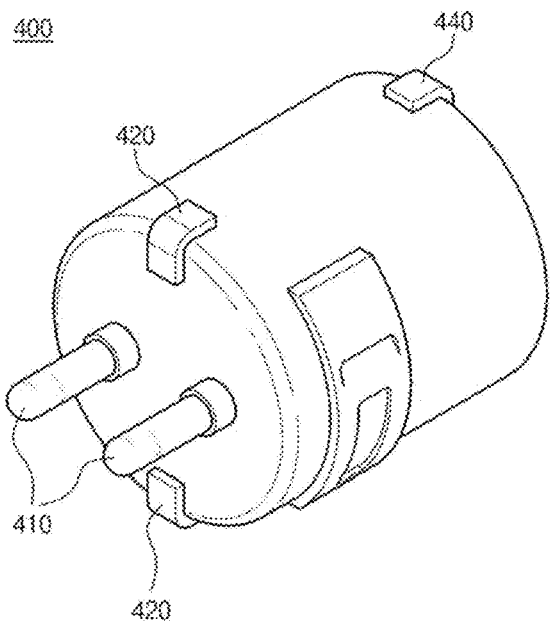
FIGS. 22 and 23 are perspective diagrams illustrating an example of product embodied in an energy conversion and storage apparatus according to an embodiment of the inventive concept.
Figure 23:
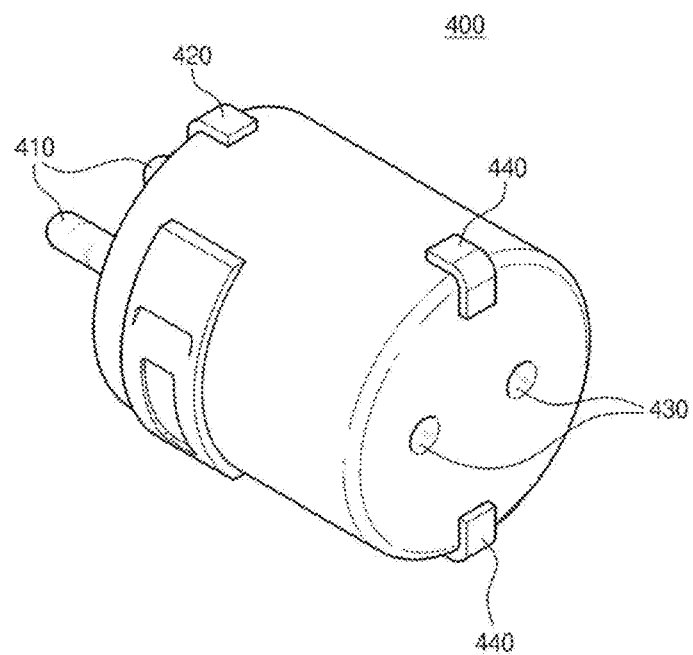

FIGS. 22 and 23 are perspective diagrams illustrating an example of product embodied in an energy conversion and storage apparatus according to an embodiment of the inventive concept.

Referring to FIGS. 22 and 23, an energy conversion and storage apparatus 400 according to an embodiment of the inventive concept may include a plug 410, a first terminal 420, a plug receiving part 430, and a second terminal 440.

The plug 410 may correspond to the first and second input terminals 312 and 314 which are described with FIGS. 18 and 19. The first terminal 420 may correspond to the ground connecting part 360 described with FIGS. 18 and 19. The plug 410 and the first terminal 420 may be connected respectively to a plug receiving part of an outlet and a ground terminal of the outlet. With this configuration, an AC voltage may be input into the plug 410 and a ground may be provided to the first terminal 420.

The plug receiving part 430 may correspond to the first and second output terminals 322 and 324 described with FIGS. 18 and 19. The second terminal 440 may correspond to the current input terminal 350 described with FIGS. 18 and 19. The plug receiving part 430 may be connected with a plug of a power consumption/transport apparatus to transmit the AC voltage, which is received from the outlet, to the power consumption/transport apparatus. The second terminal 440 may be connected with a ground terminal of the plug of the power consumption/transport apparatus to receive an AC from the power consumption/transport apparatus.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

INDUSTRIAL APPLICABILITY

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. An energy conversion and storage apparatus using an electronic wave, the apparatus comprising:
a rectifying part configured to rectify an AC generated through conversion of an electronic wave that is received from an external source; and
a storing part configured to receive and store the rectified AC and to receive a ground,
wherein the storing part comprises a capacitor including first and second ends, and wherein the first end of the capacitor is switched with a ground in accordance with a polarity of the AC, and
wherein the second end of the capacitor is provided with a ground in a section where the AC is polarized in (+), and wherein the first end of the capacitor is provided with a ground in a section where the AC is polarized in (−).

2. An energy conversion and storage apparatus using an electronic wave, the apparatus comprising:
a rectifying part configured to rectify an AC generated through conversion of an electronic wave that is received from an external source;
a storing part configured to receive and store the rectified AC and to receive a ground; and
a grounding part connected with the rectifying part but without direct connection with the storing part, wherein the grounding part is configured to provide a ground to the storing part,
wherein the storing part comprises a capacitor including first and second ends, and wherein the first end of the capacitor is switched with a ground in accordance with a polarity of the AC.

3. An energy conversion and storage apparatus using an electronic wave, the apparatus comprising:
an electronic wave-current converting part configured to convert the electronic wave, which is generated from a power transport line, into an AC;
a rectifying part configured to rectify the AC;
a storing part configured to store the rectified AC and to receive a ground; and
a power transport apparatus that comprises a first power transport tower, a second power transport tower is isolated from the first power transport tower, and a power transport line connected to the first power transport tower and the second power transport tower,
wherein the electronic wave-current converting part is disposed adjacent to the first power transport tower, the second power transport tower, and the power transport line, and is shaped in a mesh or sheet made of a conductive material.

4. The energy conversion and storage apparatus of claim 3, wherein:
the electronic wave-current converting part comprises an outer frame and an inner frame connected with the outer frame,
the electronic wave-current converting part is shaped of a mesh in the outer frame, and
the outer frame is wider than the inner frame.

5. The energy conversion and storage apparatus of claim 3, wherein the power transport apparatus further comprises:
a first power transport line connected with the first power transport tower and the second power transport tower; and
a second power transport line connected with the first power transport tower and the second power transport tower and isolated from the first power transport line,
wherein the electronic wave-current converting part is disposed between the first power transport line and the second power transport line and is elongated toward a direction in which the first and second power transport lines are elongated.

6. The energy conversion and storage apparatus of claim 3, wherein the rectifying part comprises:
a first node receiving the AC;
a first diode having (a) an anode, and (b) a cathode connected with the first node;
a second diode having (a) an anode connected with the first node, and (b) a cathode;
a third diode including (a) an anode connected with the anode of the first diode, and (b) a cathode provided with a ground; and
a fourth diode including (a) an anode connected with the cathode of the third diode and provided with a ground, and (b) a cathode connected with the cathode of the second diode.

7. An energy conversion and storage apparatus comprising:
first and second input terminals configured to receive a voltage from a first external source;
a ground providing part connected with the first and second input terminals and configured to generate a ground from the voltage;
a ground connecting part connected with an external grounding part;
a current input terminal configured to receive a current from a second external source; and
a converting part that is configured to receive the ground from the ground providing part and/or the ground connecting part, and that is connected with the current input terminal to rectify and store the current, which is received from the second external source, as electric energy.

8. The energy conversion and storage apparatus of claim 7, wherein the current input into the current input terminal includes an AC that is converted from an electronic wave generated from a power consumption/transport apparatus.

9. The energy conversion and storage apparatus of claim 7, further comprising:
   first and second output terminals connected respectively with the first and second input terminals, and configured to receive the voltage and to output the voltage externally; and
   an EMI filter configured to connect the first and second input terminals with the first and second output terminals.

10. The energy conversion and storage apparatus of claim 7, wherein the first and second input terminals are connected with an external outlet to receive the voltage, and wherein the ground connecting part is connected with a grounding part of the external outlet.

11. The energy conversion and storage apparatus of claim 7,
   further comprising first and second output terminals connected respectively with the first and second input terminals, and configured to receive the voltage and to output the voltage externally,
   wherein the current input terminal is connected with the first and second output terminals and is further connected with a ground terminal of a plug of a power consumption/transport apparatus that receives the voltage from the first and second output terminals and consumes or transports power.

* * * * *

UNITED STATES PATENT AND TRADEMARK OFFICE
CERTIFICATE OF CORRECTION

PATENT NO. : 10,511,195 B2
APPLICATION NO. : 15/110789
DATED : December 17, 2019
INVENTOR(S) : Seunghyeon Yi Page 1 of 1

It is certified that error appears in the above-identified patent and that said Letters Patent is hereby corrected as shown below:

On the Title Page

Please replace item (73) "PMUMIDEA, Seoul (KR)" with --POMUMIDEA, Seoul (KR)--.

Signed and Sealed this
Eleventh Day of February, 2020

Andrei Iancu
*Director of the United States Patent and Trademark Office*